US012266868B2

(12) United States Patent
Hojjat et al.

(10) Patent No.: US 12,266,868 B2
(45) Date of Patent: Apr. 1, 2025

(54) METHOD AND APPARATUS FOR ISOLATION ENHANCEMENT AND PATTERN IMPROVEMENT OF HIGH FREQUENCY SUB-ARRAYS IN DENSE MULTI-BAND OMNI DIRECTIONAL SMALL CELL ANTENNAS

(71) Applicant: Communication Components Antenna Inc., Kanata (CA)

(72) Inventors: Nasrin Hojjat, Ottawa (CA); Paul Clarke, Kanata (CA); Zouhair Briqech, Ottawa (CA)

(73) Assignee: Communication Components Antenna Inc., Ontario (CA)

( * ) Notice: Subject to any disclaimer, the term of this patent is extended or adjusted under 35 U.S.C. 154(b) by 0 days.

(21) Appl. No.: 17/463,991

(22) Filed: Sep. 1, 2021

(65) Prior Publication Data

US 2022/0109237 A1 Apr. 7, 2022

Related U.S. Application Data

(60) Provisional application No. 63/074,328, filed on Sep. 3, 2020.

(51) Int. Cl.
*H01Q 5/30* (2015.01)
*H01Q 1/24* (2006.01)
*H01Q 15/16* (2006.01)

(52) U.S. Cl.
CPC ............... *H01Q 5/30* (2015.01); *H01Q 1/246* (2013.01); *H01Q 15/161* (2013.01)

(58) Field of Classification Search
CPC ... H01S 5/30; H01S 5/307; H01S 5/40; H01S 5/42; H01Q 1/246; H01Q 1/52; H01Q 1/521; H01Q 1/523; H01Q 21/06; H01Q 21/20; H01Q 21/205; H01Q 21/24; H01Q 21/26; H01Q 21/29; H01Q 21/30; H01Q 5/30; H01Q 5/307; H01Q 5/40; H01Q 5/42
See application file for complete search history.

(56) References Cited

U.S. PATENT DOCUMENTS 10,050,752 B1 * 8/2018 Bales ...................... H01Q 3/242
10,797,408 B1 * 10/2020 Boutayeb ................. H01Q 9/42
(Continued)

*Primary Examiner* — Jason Crawford
(74) *Attorney, Agent, or Firm* — Sofer & Haroun, LLP

(57) ABSTRACT

An omni-directional small cell base station antenna includes at least one array of a first frequency on a lower portion of the antenna, at least one second array of a second frequency on an upper portion of the antenna, and at least one third array of a third frequency on the upper portion of the antenna. The second frequency is higher than the first frequency, and the third frequency is higher than the second frequency. The at least one second array at a second frequency includes a plurality of reflector plates with antenna elements of the second frequency thereon, and the at least one third array at a third frequency includes a plurality of reflector plates with antenna elements of the third frequency thereon. The reflector plates of the at least one second array are interspersed between the reflector plates of the at least one third array such that the reflector plates of the second and third arrays alternate around the circumference of the upper portion of the antenna.

17 Claims, 22 Drawing Sheets

(56) References Cited

U.S. PATENT DOCUMENTS

| | | | | |
|---|---|---|---|---|
| 2015/0256213 | A1* | 9/2015 | Jan | H01Q 25/002 370/338 |
| 2015/0380815 | A1* | 12/2015 | Boutayeb | H01Q 21/20 343/777 |
| 2017/0085289 | A1* | 3/2017 | Jan | H01Q 25/002 |
| 2018/0227775 | A1* | 8/2018 | Bisiules | H01Q 5/48 |
| 2018/0367199 | A1* | 12/2018 | Zimmerman | H01Q 3/2605 |
| 2019/0103660 | A1* | 4/2019 | Zimmerman | H01Q 19/06 |
| 2019/0123426 | A1* | 4/2019 | Bryce | H01Q 5/42 |
| 2019/0173161 | A1* | 6/2019 | Farzaneh | H01Q 1/521 |
| 2019/0312337 | A1* | 10/2019 | Farzaneh | H01Q 21/205 |
| 2020/0243951 | A1* | 7/2020 | Liu | H01Q 1/246 |
| 2020/0411961 | A1* | 12/2020 | Kasani | H01Q 21/062 |
| 2022/0109237 | A1* | 4/2022 | Hojjat | H01Q 1/523 |

* cited by examiner

Pattern BAND3 in the presence of lower BAND2 array(fig.1)

Pattern BNAD3 array by itself (in absence of BAND2 array)

Patent approach:12 sided Interleaving BAND3 and BAND4 and using waveguiding caps Original approach : existing art pattern of 5.25 Ghz with R4=R2 in Fig16 pattern of 5.25Ghz with R4=0.5R2 in Fig1

METHOD AND APPARATUS FOR ISOLATION ENHANCEMENT AND PATTERN IMPROVEMENT OF HIGH FREQUENCY SUB-ARRAYS IN DENSE MULTI-BAND OMNI DIRECTIONAL SMALL CELL ANTENNAS

RELATED APPLICATION

This application claims the benefit of priority from U.S. Provisional Application No. 63/074,328 filed on Sep. 3, 2020, the entirety of which is incorporated by reference.

FIELD OF THE INVENTION

The present invention relates to antennas for wireless communication. More particularly, the present invention relates to a multiport multiband quasi-omnidirectional antenna for small cell applications with improved patterns for mid and high band frequencies.

PRIOR ART

Design of omni-directional small cell base station antennas, confined to small volumes, having many ports, and operating at multiple of frequency bands, provides many technical hurdles. This is particularly true of designs for making these antennas as compact as possible without compromising signal integrity.

Multiband MIMO (Multiple-In Multiple-Out) small cells among other technologies are used in 5G networks to provide increased capacity. Small cell networks can also help increase the capacity of existing 4G wireless networks. These small cells operate at relatively lower power levels and fill the coverage gaps in existing wireless systems.

One prior art implementation of such multiband multiport omni directional antenna is shown in FIG. 1, with the feeding structure for BAND-3 and BAND-4 shown in FIG. 2. In this present prior art illustration reference is made to very high frequency arrays at “BAND-4” for 5.15-5.92 GHz, high frequency arrays at “BAND-3” for 3.3-3.8 GHz, and mid frequency arrays at “BAND-2” at 1.69-2.69 GHz. This nomenclature of BAND-4, BAND-3, BAND-2, as well as an additional low frequency band at “BAND-1” for BAND-1 (698-960 MHz) (not shown in this prior art figure but discussed later) is used for these frequency ranges throughout this application for consistency.

In this implementation as shown in FIG. 1, subarrays for different frequency bands are stacked over each other. The lower frequency band arrangements which are more bulky are located on the bottom of the array and higher frequency bands on top.

Antenna size has a direct relation with wavelength so at lower frequencies with larger wavelengths, antenna elements and array dimensions are larger such as with BAND-1 and BAND-2 frequencies. The lower frequency band array structures, including both the reflector and the elements themselves act as unwanted reflecting surfaces for higher band arrays such as the BAND-3 and BAND-4 arrays. The re-radiation of waves off of these surfaces add or exacerbate un-desired radiation patterns and can partially destroy the shape of the desired high frequency pattern. Reducing this unwanted effect of the bulkier lower band radiators and reflectors on the performance of smaller radiator elements of the higher band arrays is a challenge.

Normally, as shown in FIG. 1, the lower BAND-2 array on the bottom of the antenna, with its significantly larger lower band structures located below the bottom of the higher band, causes beam peak misalignment and upper sidelobe problems for the higher band arrays. This is particularly a concern for the U-NII (Unlicensed National Information Infrastructure) band (BAND-4 in this application) which has strict requirements for higher band Side Lobe Level (SLL) according to FCC regulations (see e.g. FCC-13-22A).

FIG. 3 shows an example of a pattern not satisfying FCC Side Lobe Level SLL radiation limit. These SLL pattern issues are caused by higher frequency currents which are induced on reflectors and elements of lower band arrays. Larger structures of the lower frequency band arrays cause more unwanted re-radiation as more current is induced on them, and small objects including the radiating elements themselves also have a resonance length in the band of interest and cause unwanted radiation. These induced currents re-radiate and disturb the radiation pattern of the higher band arrays when they are tested in the full array in the presence of lower frequency arrays.

In structures of prior art FIG. 1, the pattern of the very high BAND-4 array is affected by the structures of both mid BAND-2 and high BAND-3 arrays, while the pattern of high BAND-3 is mainly affected by the presence of mid BAND-2 structure. For example, FIG. 4 shows, both a pattern for the BAND-3 array as shown in prior art FIG. 1 in the presence of the mid BAND-2 array structure (top), and also an exemplary ideal pattern from a BAND-3 array taken by itself in isolation (i.e. without the larger structure of the BAND-2 array in FIG. 1) (bottom). The degradation of pattern of BAND-3 in the presence of the BAND-2 array structure shown at the top of FIG. 4 is evident from the exacerbated side lobe levels (SLLs) and ripple effects over the entire beam pattern.

One prior art option to address this issue is to increase the spacing between higher and lower band arrays which can reduce the effect of spurious re-radiation of the higher bands from the low band reflectors and elements, but this solution is not possible for very dense arrays with limited height where there are no possibilities of introducing extra space between different band arrays.

OBJECTS AND SUMMARY

The present arrangement includes several improvements over the prior art design that greatly reduce the effect of lower frequency array structures on the performance of higher frequency radiators, particularly with reduction of elevated side lobe levels. The approaches used in the embodiments herein are implemented in at least the four exemplary antennas described herein.

The following is a summary of an array architecture for such exemplary antennas. Further details and explanations, including the array arrangement details can be found in the drawings and detailed description sections of this application.

In one embodiment a multiband multiport MIMO omni directional antenna is provided for reducing the coupling and improving the elevation pattern and gain of higher frequency band arrays in the presence of lower frequency band arrays. This antenna utilizes interleaving of the high band (BAND-3) and higher band (BAND-4) arrays horizontally on a single structure rather than vertically on two separate structures, using polygon prisms or cylinders for the reflectors.

Waveguiding metal plates with equal dimensions are used on a top section of the antenna for the reflectors of both the high and very high band arrays (BAND-3 and BAND-4)

which make the lower band arrays almost invisible to higher band arrays. Thus, BAND-3 and BAND-4 use substantially equal diameters for their respective interleaved arrays which, when stacked over the larger low band array, reduces the negative impact of the low band structures on the high and mid band patterns. When upper arrays have a diameter that is more near to the lower array the destructive effect of lower array structure on upper band pattern would be less as the amount of multi reflection from bottom structure is reduced. When BAND-3 and BAND-4 are combined into a twelve sided array as in FIG. 5, the diameter of BAND-3+ BAND-4 is more than FIG. 1 in which they were stacked above each other.

In another embodiment, that can be combined or not with the above embodiment, the waveguiding metal plates dividing BAND-3/BAND-4 from BAND-2/BAND-1 have the same radius and shape of the lower part of the array (BAND-2/BAND-1). For example as shown in FIG. 5 the metal waveguide plates are the same diameter as the lower BAND-2 array. See also FIG. 8.

In one embodiment, a new triangular shape 6-sided prism is hosting three 2×2 MIMO arrays in one band, e.g. BAND-2, and up to two 2×2 MIMO arrays in another band e.g. BAND-1. See FIG. 8. This embodiment likewise may be constructed with wave guide plates between BAND-3/BAND-4 and the lower frequency bands that are the same diameter as the lower frequency structures.

In one embodiment, possibly in combination with the other embodiments, the antenna includes and upper portion in the shape of a polygon prism that has sides with unequal widths, larger widths for the larger elements in BAND-3 and smaller widths for the smaller elements in BAND-4.

In one embodiment, the antenna can have four bands and provides seven 4×4 MIMO arrays in different bands.

In one embodiment, the antenna can have four bands and provides six 4×4 MIMO arrays in different bands.

In one embodiment, the antenna can have three bands and provides four 4×4 MIMO arrays in different bands.

In one embodiment, the antenna can have two bands and provides two 4×4 MIMO arrays in the two bands.

In one embodiment, possibly in combination with the other embodiments, the reflectors of the antenna are in the shape of a continuous cylinder.

In one embodiment, the antenna has a shortened dipole for the low band (BAND 1—698-960 MHz) array.

To this end, the present arrangement provides To this end, the present arrangement provides for an omni-directional small cell base station antenna includes at least one array of a first frequency on a lower portion of the antenna, at least one second array of a second frequency on an upper portion of the antenna, and at least one third array of a third frequency on the upper portion of the antenna. The second frequency is higher than the first frequency, and the third frequency is higher than the second frequency. The at least one second array at a second frequency includes a plurality of reflector plates with antenna elements of the second frequency thereon, and the at least one third array at a third frequency includes a plurality of reflector plates with antenna elements of the third frequency thereon. The reflector plates of the at least one second array are interspersed between the reflector plates of the at least one third array such that the reflector plates of the second and third arrays alternate around the circumference of the upper portion of the antenna.

In another embodiment of the present arrangement, an omni-directional small cell base station antenna includes at least one array of a first frequency on a lower portion of the antenna, at least one second array of a second frequency on an upper portion of the antenna, and at least one third array of a third frequency on the upper portion of the antenna. The second frequency is higher than the first frequency, and the third frequency is higher than the second frequency. The at least one second array at a second frequency includes a plurality of reflector plates with antenna elements of the second frequency thereon, and the at least one third array at a third frequency includes a plurality of reflector plates with antenna elements of the third frequency thereon. The plurality of reflector plates of the second array with antenna elements of the second frequency thereon, are wider than the plurality of reflector plates of the third array with antenna elements of the third frequency thereon. The upper portion of the antenna has a substantially triangular structure composed of six sides, owing to the different widths of the reflector plates of the second and third arrays.

In another embodiment of the present arrangement, an omni-directional small cell base station antenna has at least one array of a first frequency on a lower portion of the antenna, at least one second array of a second frequency on an upper portion of the antenna, and at least one third array of a third frequency on the upper portion of the antenna. The second frequency is higher than the first frequency, and the third frequency is higher than the second frequency. The at least one second array at a second frequency includes a plurality of reflector plates with antenna elements of the second frequency thereon, and the at least one third array at a third frequency includes a plurality of reflector plates with antenna elements of the third frequency thereon. The antenna further has at least a first upper wave guide plate above the upper portion of the antenna, and further having at least a second lower wave guide plate below the upper portion of the antenna, the second lower wave guide plate dividing the upper and lower portions of the antenna.

BRIEF DESCRIPTION OF THE DRAWINGS

The present invention can be best understood through the following description and accompanying drawing, wherein.

DETAILED DESCRIPTION

Figure 5A:
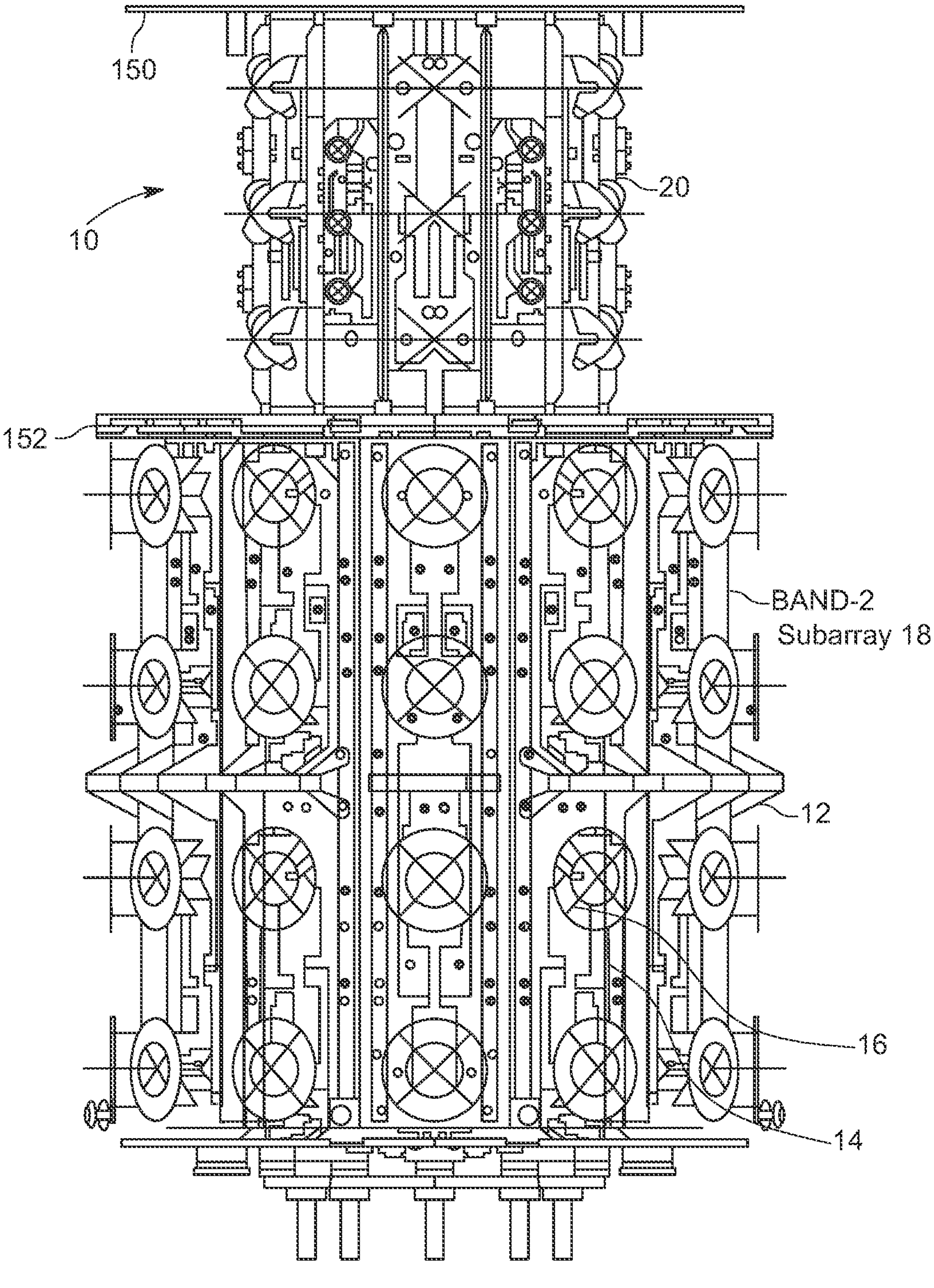
FIG. 5A shows a triband antenna with horizontal interleaving of BAND-3 and BAND4 with different panel widths used for BAND-3 and BAND-4. Symmetrical waveguiding metal plates with same diameter as BAND-2 array are used to improve elevation pattern of BAND-3 and BAND-4, in accordance with one embodiment
Figure 5B:
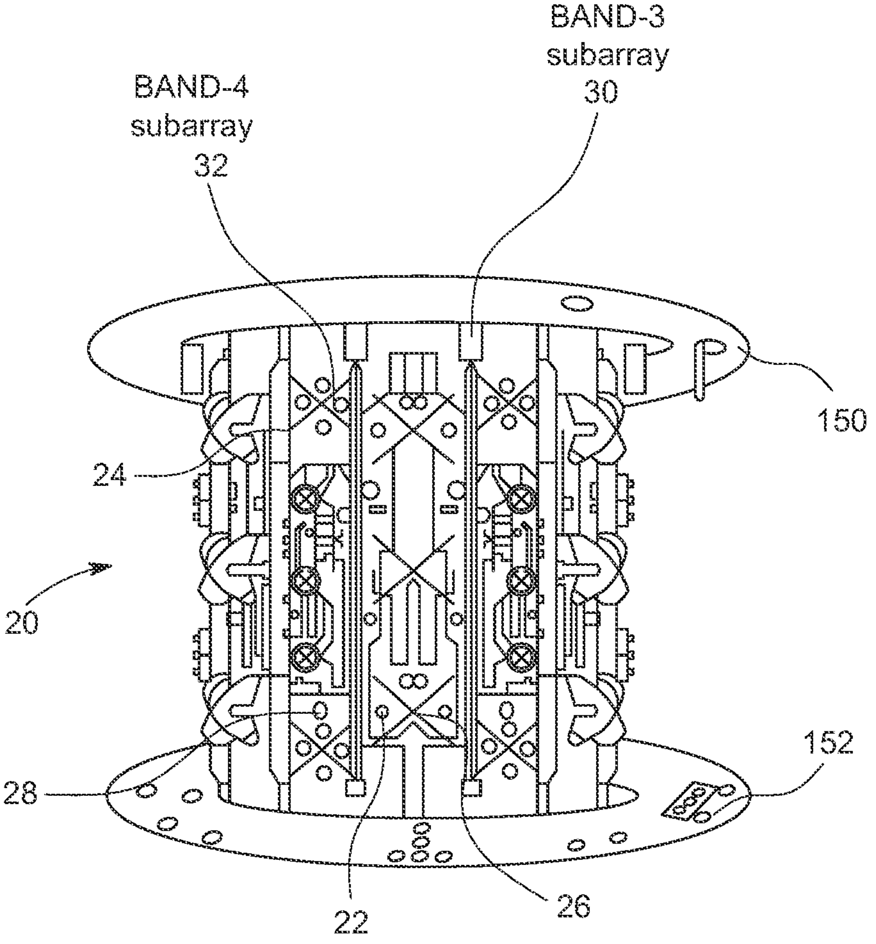
FIG. 5B shows a partial view of the top half of the antenna of FIG. 5A.

In one embodiment as shown in FIGS. 5A and 5B, an omni-directional small cell base station antenna 10 is shown with a lower structure 12 having spaced apart mid band reflectors 14, each with four mid band (BAND-2) dipole elements 16 forming a mid band (BAND-2) array 18. As shown in Both FIGS. 5A and 5B, antenna 10 also has an upper section 20 that has alternating high band (BAND-3) reflector plates 22 and very high band (BAND-4) reflector plates 24 each with high band (BAND-3) radiating elements 26 and very high band (BAND-4) radiating elements 28 respectively. Plates 22 and elements 26 form a high band (BAND-3) array 30 and plates 24 and elements 28 form a very high band (BAND-4) array 32. FIG. 5B is the close up of upper section 20 shown apart from lower structure 12.

Figure 1:
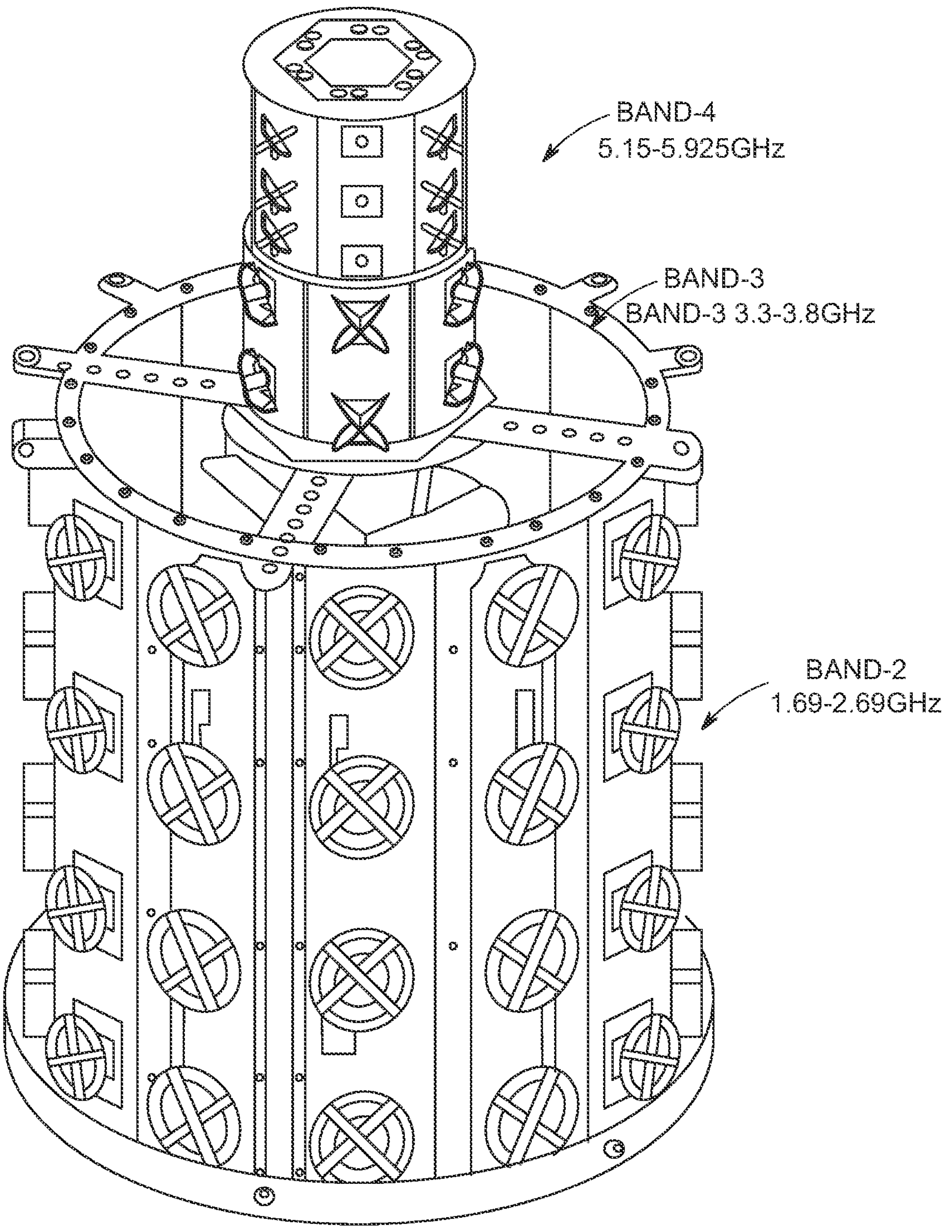
FIG. 1 (Prior art)
FIG. 1 is a prior art antenna architecture with stacking different band arrays over each other.
Figure 2:
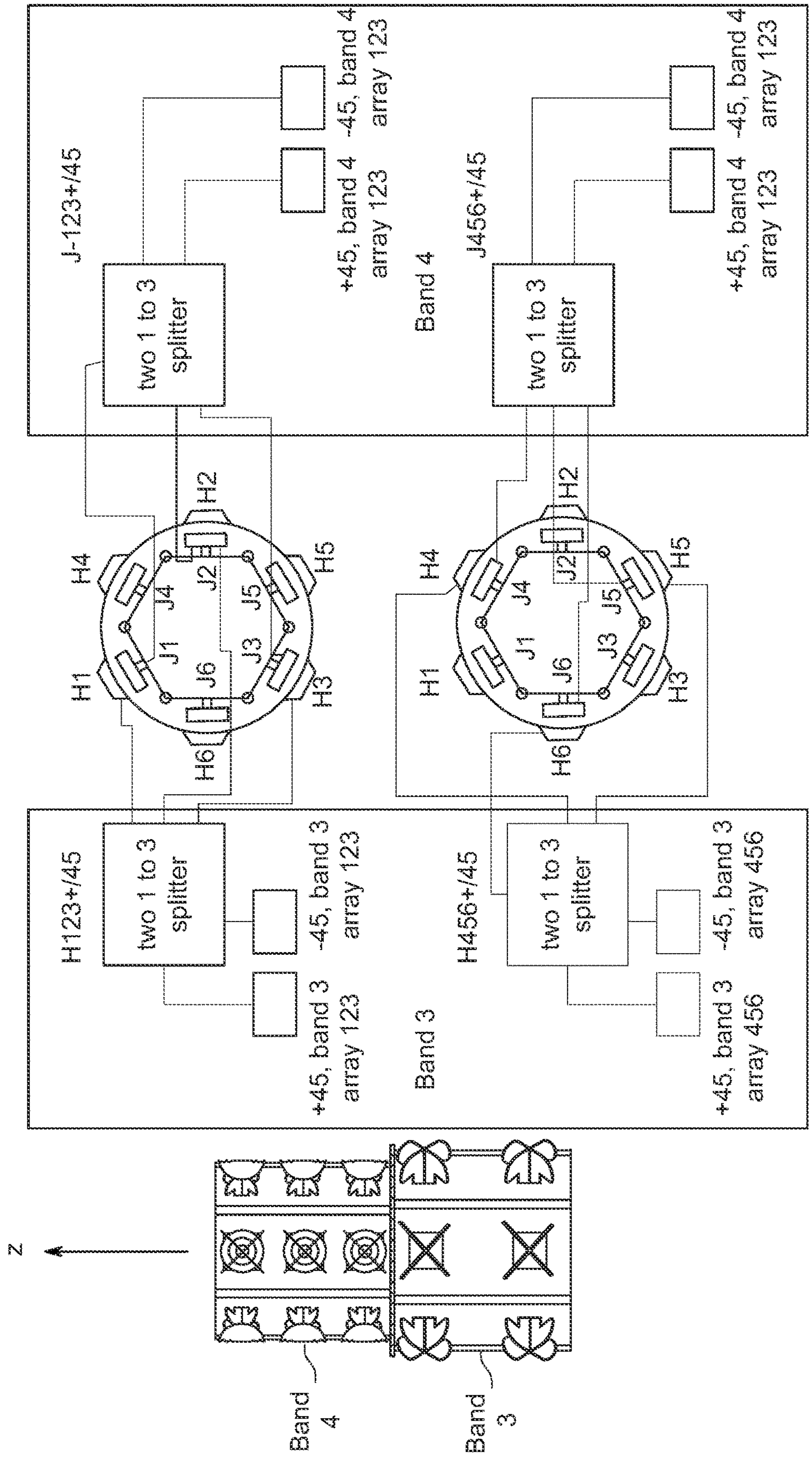
FIG. 2 is a prior art Azimuth feeding network for 4*4 MIMO quasi omni antenna of FIG. 1 for BAND-3 and BAND-4.
Figure 3:
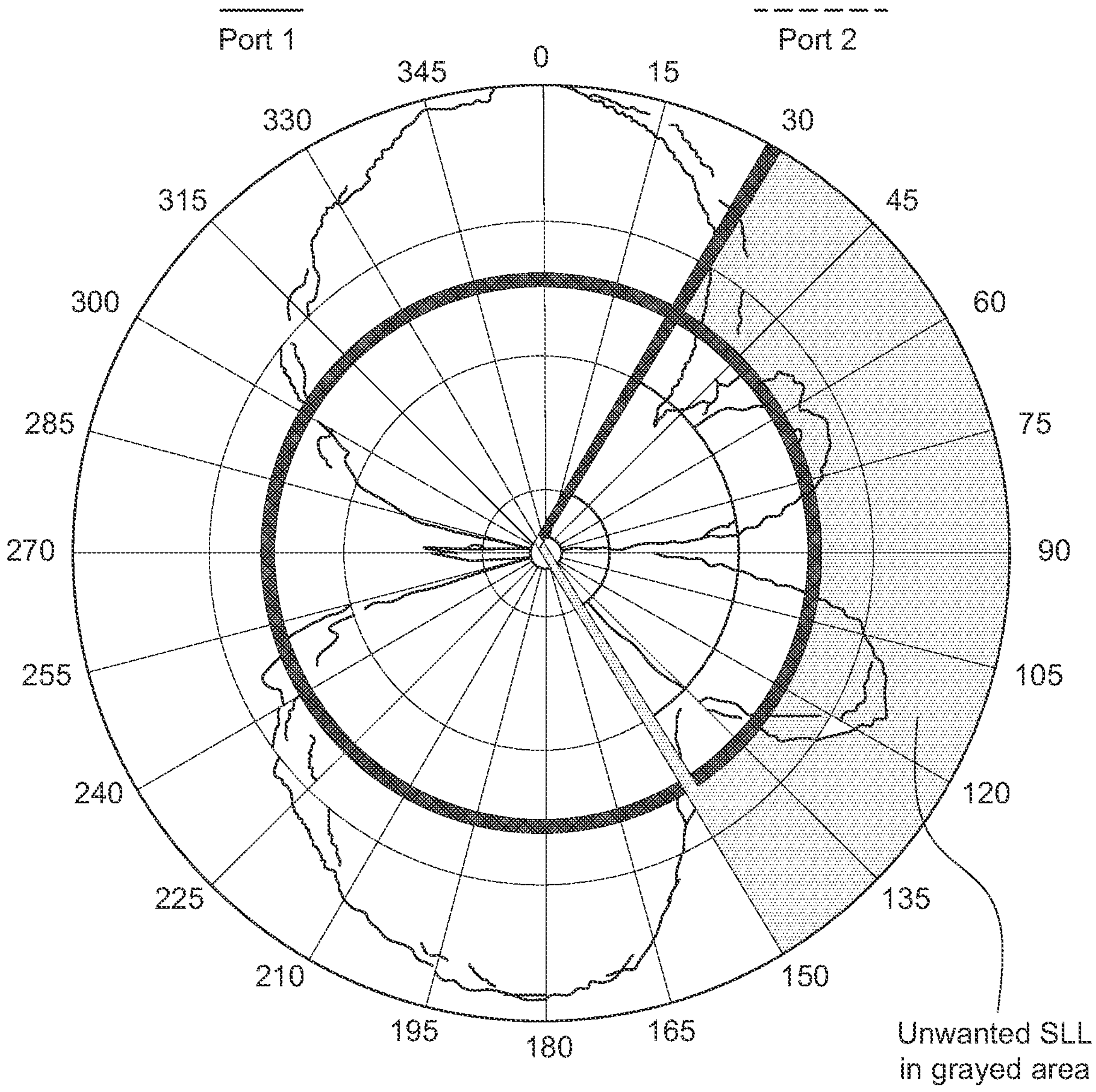
FIG. 3 (Prior art)
FIG. 3 shows an exemplary pattern of prior art in BAND-4 with unwanted excessive sidelobes in excess of the FCC regulations for U-NII.

As shown in FIG. 5B, for the combined high and very high band arrays 30 and 32 on upper portion 20 of antenna 10, reflector plates 22 and 24 are interspersed (every other plate) around the circumference instead of vertically stacking the two different band arrays as in prior art FIG. 1. With such an approach, high band reflectors 22 and high band elements 26 for BAND-3 array 30, with the bigger structures, does not affect elevation pattern of the smaller high band BAND-4 array 32. With interleaving horizontally, the induction current from one band on the other one does not affect the elevation pattern in main plane, as the other band elements are off the longitudinal axis.

By interleaving horizontally, for a fixed vertical length, there is also more available length and therefore the number of elements 24 or 28 can be increased which improves the gain of antenna 10 and related pattern shape. See for example high band elements of BAND-3 array having only two elements vertically in prior art FIG. 1 while BAND-3 array 30 has three elements 26 vertically as shown in the present FIGS. 5A and 5B. It is noted that FIGS. 5A and 5B illustrates only an exemplary version of this approach, but it is understood that it could be applied in other embodiments, including upper sections with higher numbers of reflectors in upper section 20 such as nine, twelve, and eighteen sides, or even with a novel cylindrical dual band array (e.g. FIG. 12 described in more detail below).

The sides of polygonal prism formed by reflector plates 14, 22, and 24 can have different widths, preferably using wider widths for reflectors plates 22 of high band (BAND-3) to provide enough clearance from edges to improve cross-polar isolation. With such interleaving of reflector plates 22 and 24 as shown in FIGS. 5A and 5B, the induction current from high band array (BAND-3) 30 does not affect very high band array 32 (BAND-4)

The choice of number of reflector panels 14, 22, and 24 depends on the number of MIMO channels needed. At a minimum for a 2×2 MIMO for BAND-3 and BAND-4 arrays 30 and 32, six panels are needed: three for the very high band BAND-4 array 32 and three for the high band BAND-3 array 30. In the 4×4 MIMO implementation shown in FIGS. 5A and 5B, six panels 22 for BAND-3 array 30 and six panels 24 for BAND-4 array 32 are used.

Figure 6:
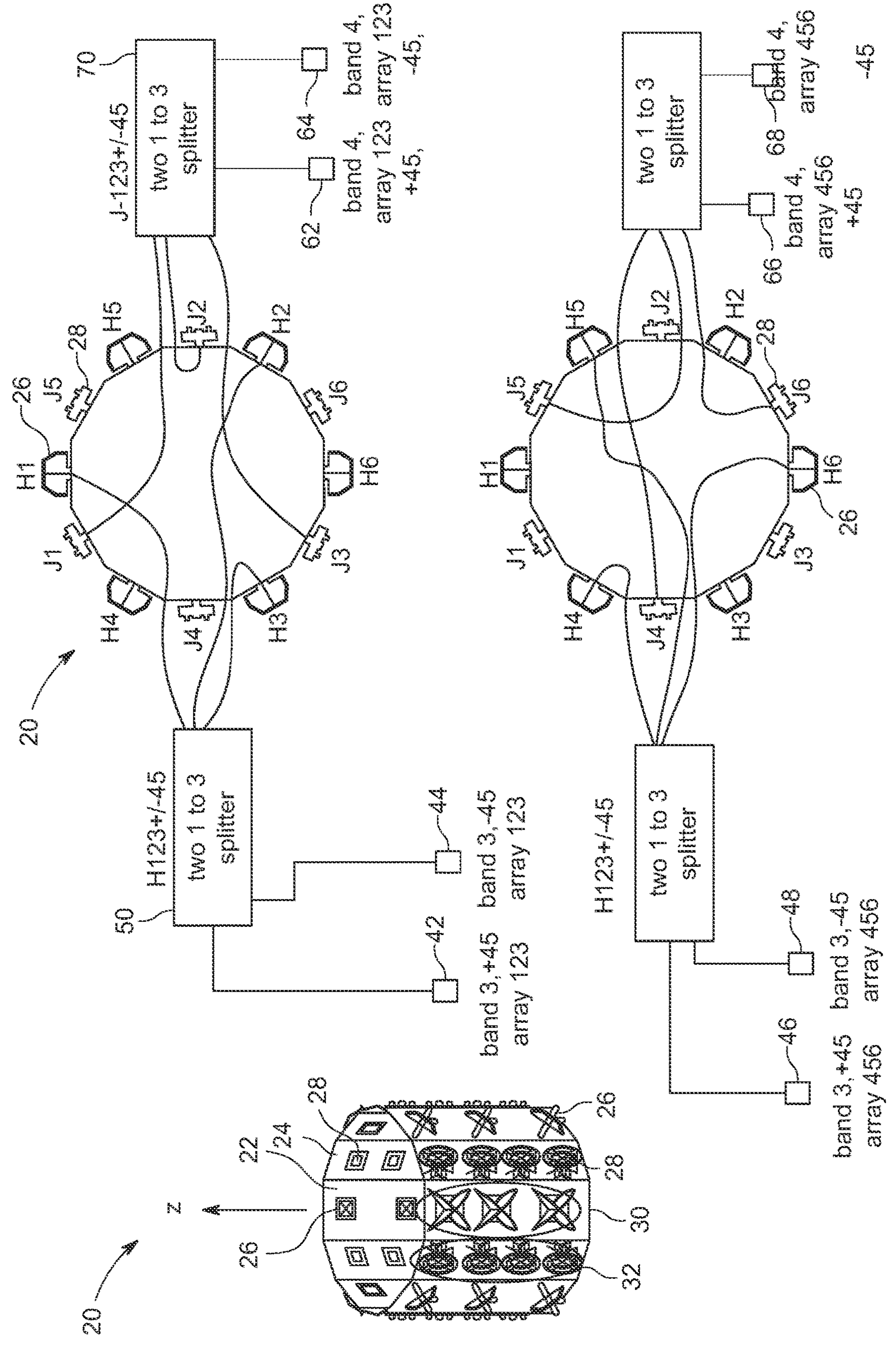
FIG. 6 shows an Azimuth feeding network for 4*4 MIMO quasi omni antenna of FIG. 5 for the upper structure BAND-3/BAND-4, in accordance with one embodiment.

FIG. 6 shows an Azimuth feeding network 40 for 4*4 MIMO quasi omni antenna of FIG. 5B for the upper structure 20 with BAND-3 array 30 and BAND-4 array 32. Feeding network 40 includes four BAND-3 ports 42, 44, 46, and 48 with ports 42, and 44 connected to a first splitter 50 and ports 46, and 48 connected to a second splitter 52. Feeding network 40 also includes four BAND-4 ports 62, 64, 66, and 68 with ports 62, and 44 connected to a first splitter 70 and ports 66, and 68 connected to a second splitter 72. Each of splitters 50, 52, 70 and 72 are shown in FIG. 6 connected to their respective elements 26 (BAND-3) and elements 28 (BAND-4) as required to establish the 4*4 MIMO pattern(s).

Figure 4:
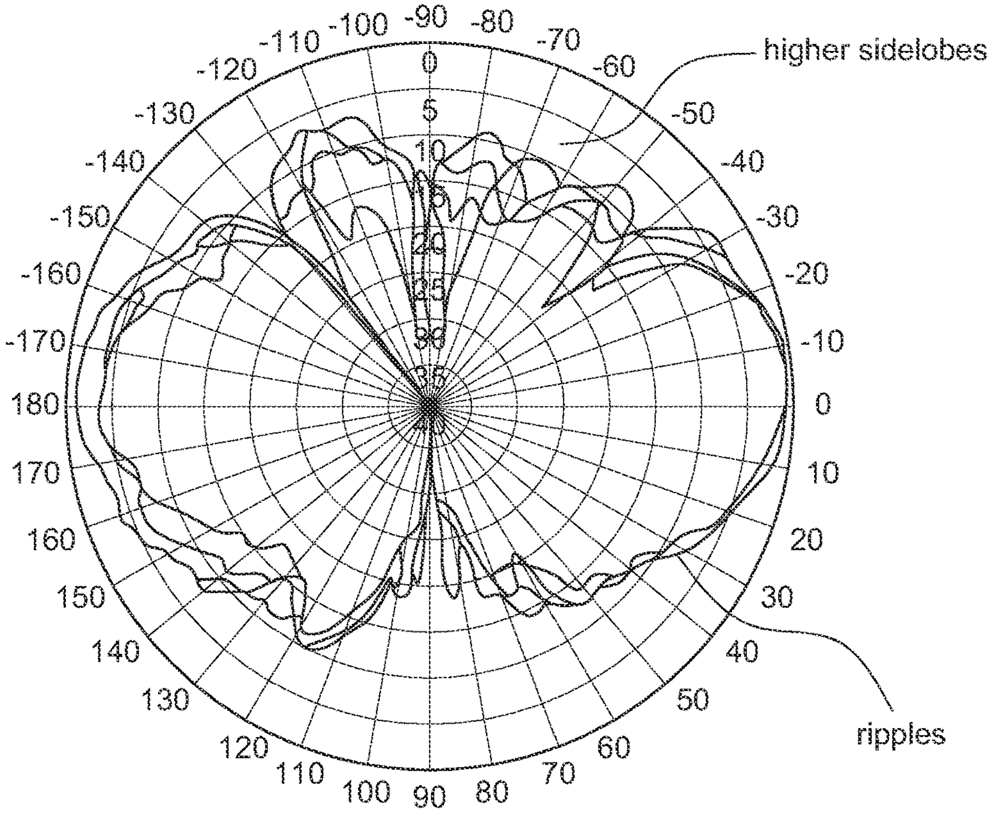
FIG. 4 (Prior art)
FIG. 4 shows comparison prior art patterns of a BAND-3 array in the presence and absence of a BAND-2 array of prior art FIG. 1.
Figure 4:
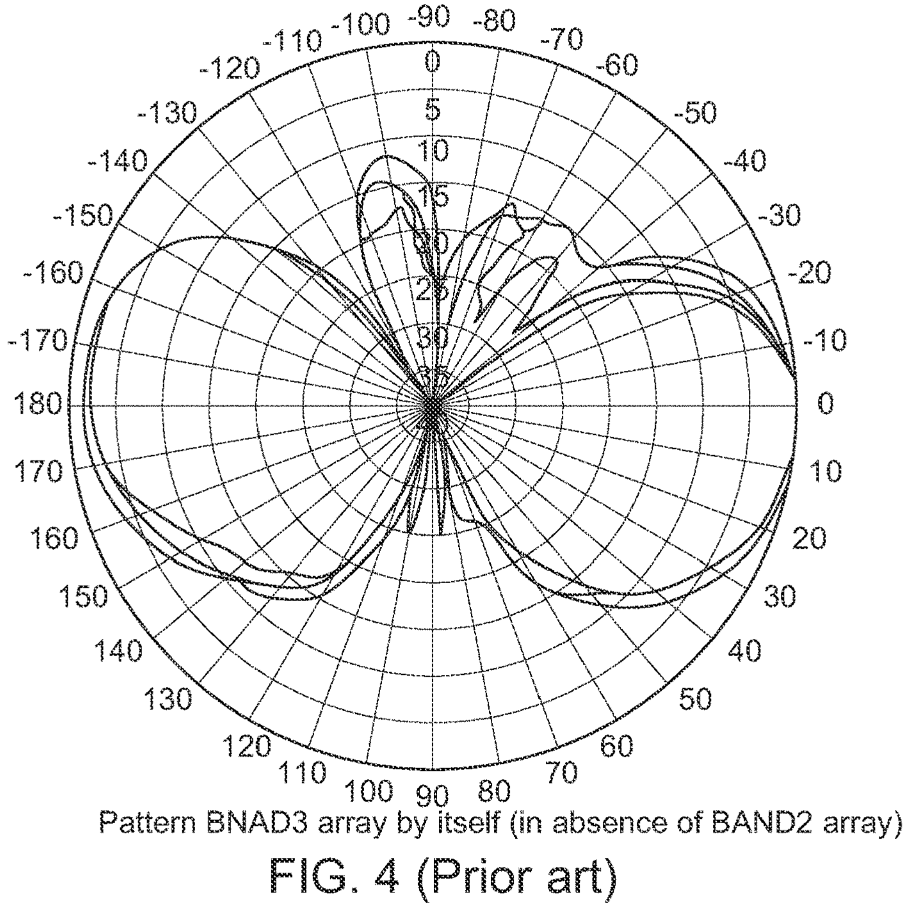
FIG. 4 (Prior art)
Figure 7:
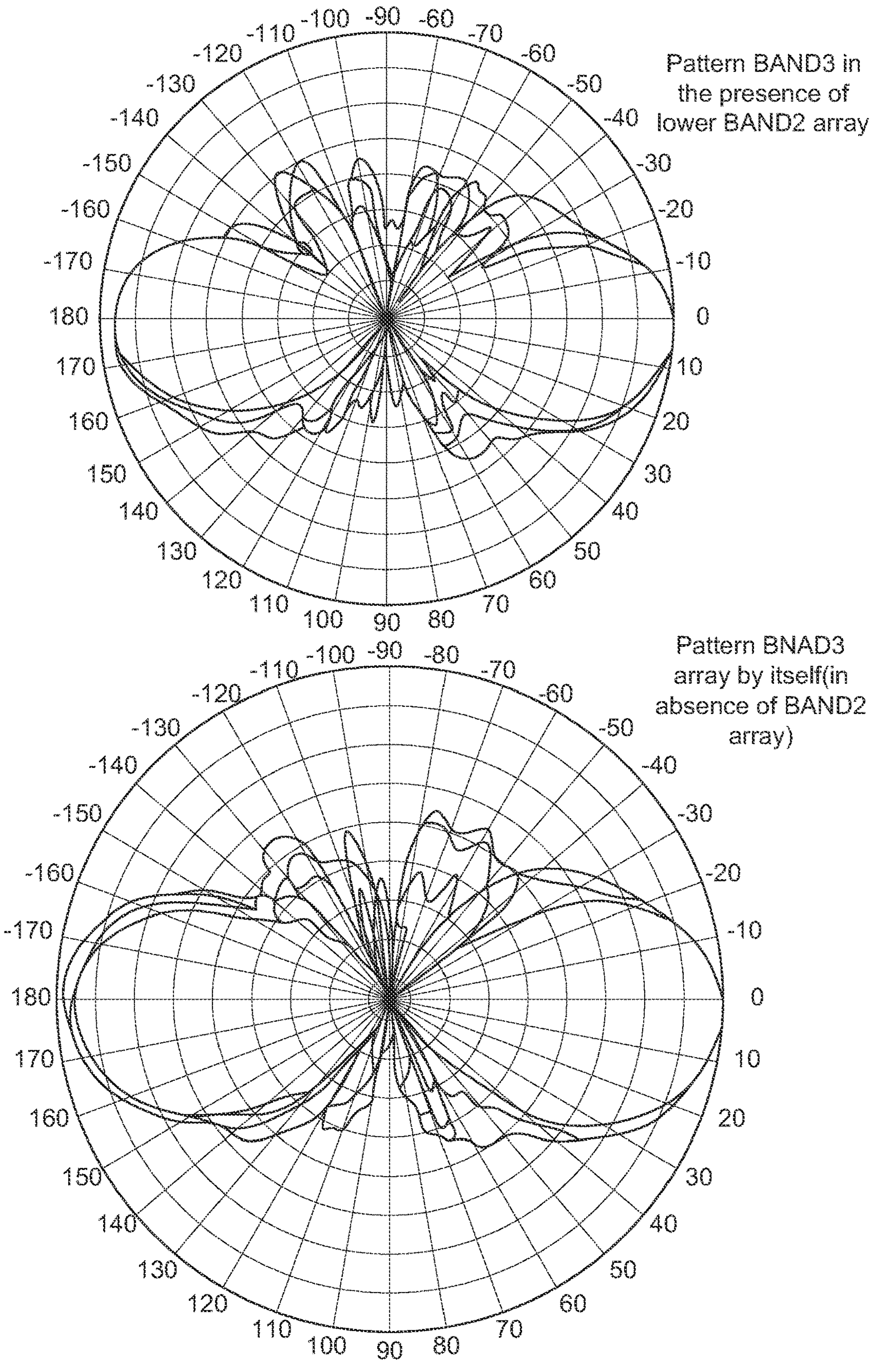
FIG. 7 is a comparison of a pattern of a BAND-3 array in the presence and absence of a BAND-2 array of FIG. 5, in accordance with one embodiment.

In one embodiment FIG. 7 shows comparison of a measured pattern of from high frequency BAND-3 array 30 of FIG. 5A in the presence BAND-2 array 18 from of FIG. 5A (top) as well as a pattern of from BAND-3 array 30 in the absence of other arrays (bottom). As illustrated in FIG. 7 the two patterns are very similar, showing that BAND-2 array 18 does not substantially affect the radiation pattern of BAND-3 array 30 owing to the arrangement shown in FIGS. 5A and 5B. This can be compared to FIG. 4 in order to observe the effectiveness of this approach in improving the pattern sidelobe, shape and directivity which compares BAND-3 from the prior art of antenna in FIG. 1 (top) with BAND-3 taken alone (bottom). A radiation pattern comparison of BAND-4 array 32 with and without the presence of BAND-2 array 18 (not shown) would similarly show no substantial interference causes by the structures of BAND-2 array 18.

Figure 8A:
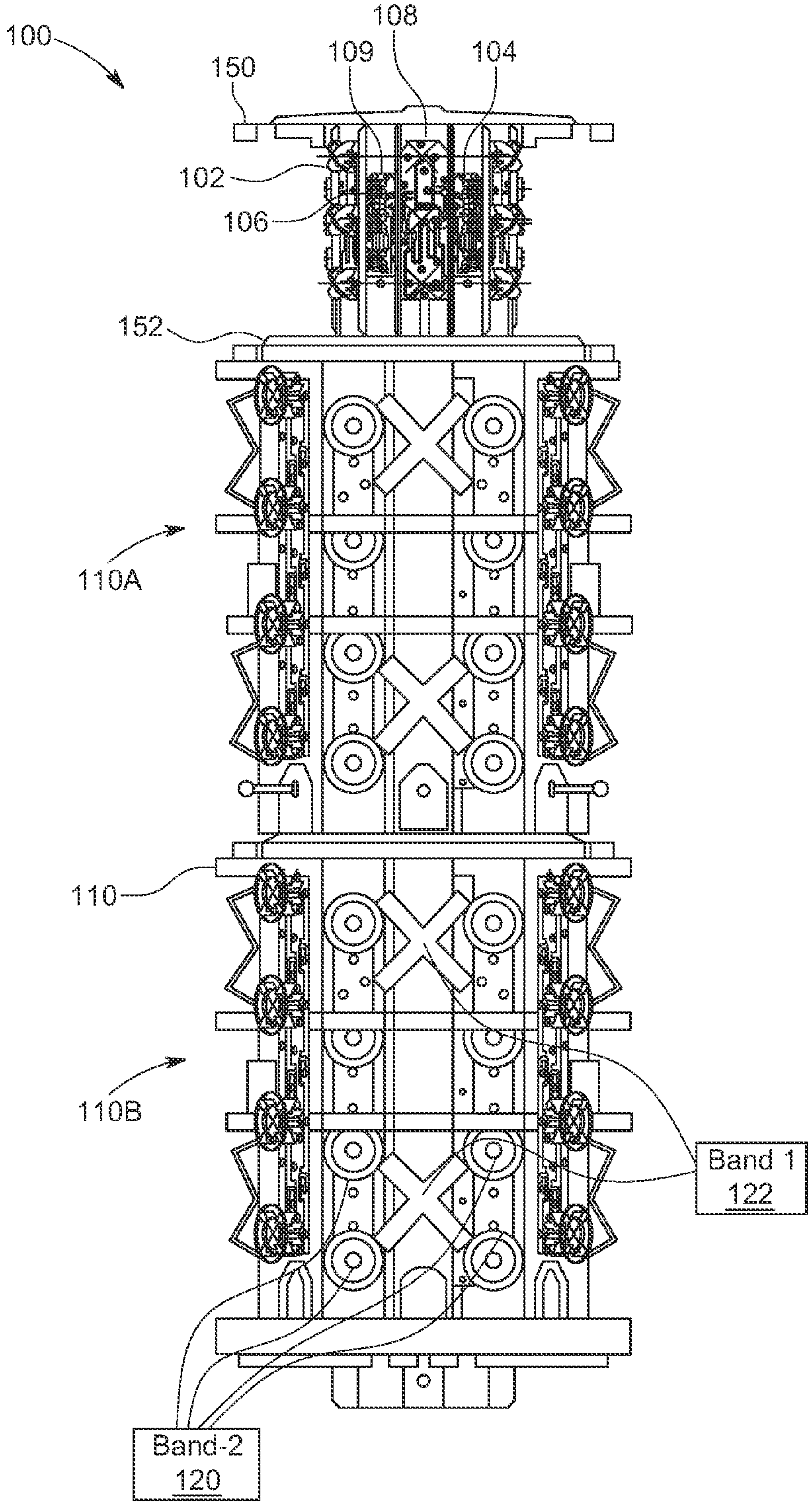
FIG. 8A illustrates an antenna with 24 ports/28 ports four band omni directional array with BAND-4 and BAND-3 having horizontal interleaving and having symmetrical waveguiding plates with the top and bottom metal plates having the same shape as the cross section of the cross section shape of BAND-1 and BAND-2 arrays, in accordance with one embodiment; BAND1 and BAND2 also have interleaving in the first and second semi-triangular prisms (110A and 110B)
Figure 8B:
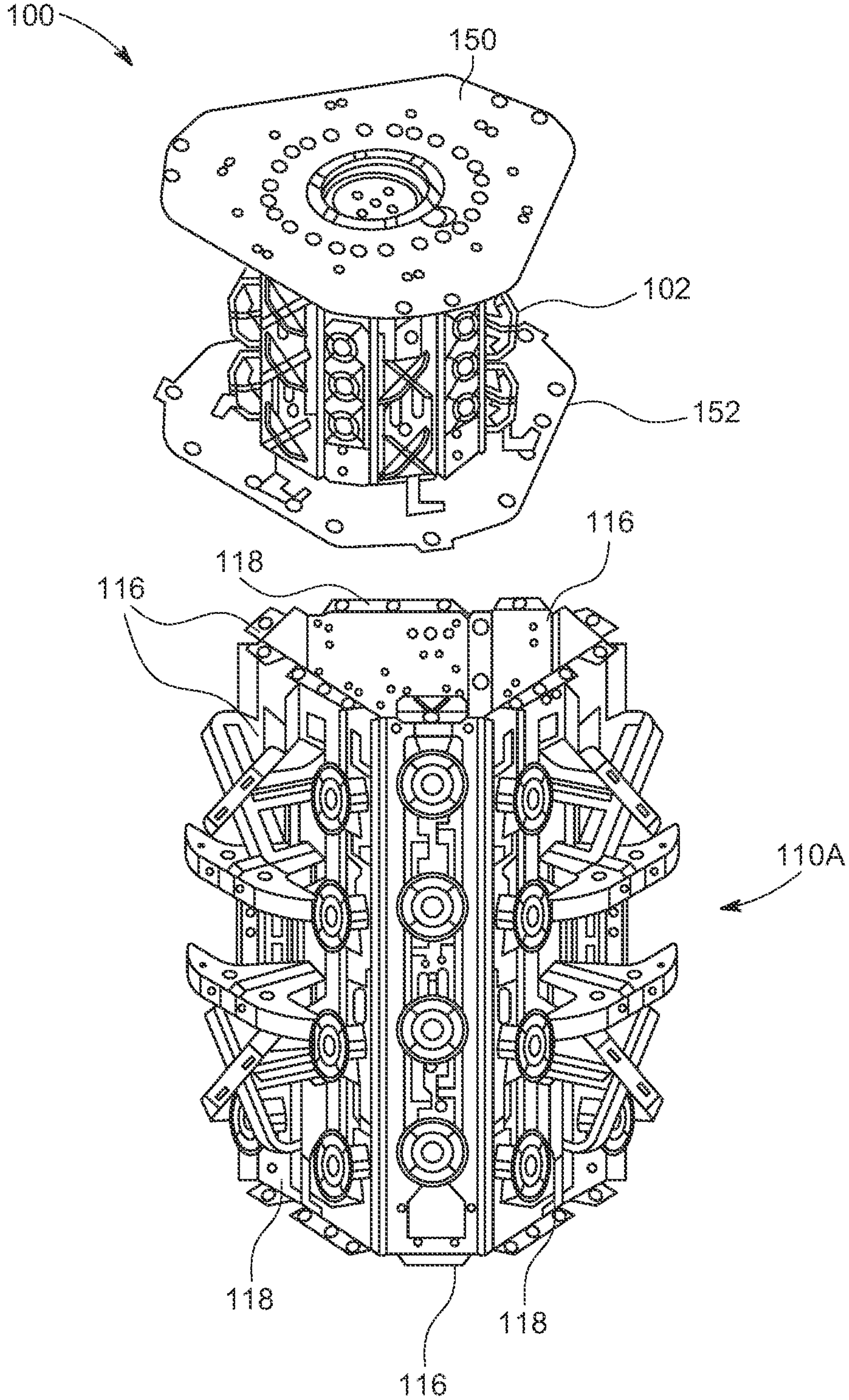
FIG. 8B shows a separated and perspective view of the antenna of FIG. 8A.
Figure 8C:
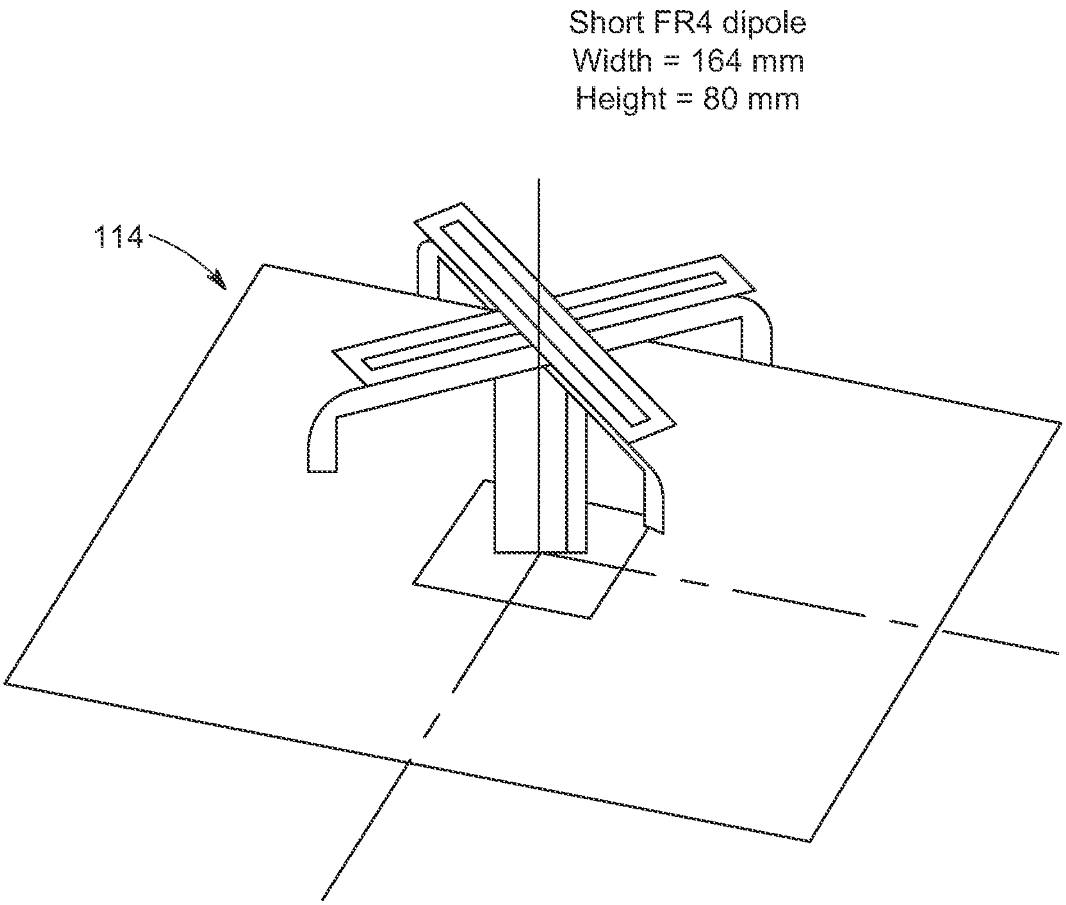
FIG. 8C shows a close up view of a dipole element from the antenna of FIG. 8A.
Figure 8D:
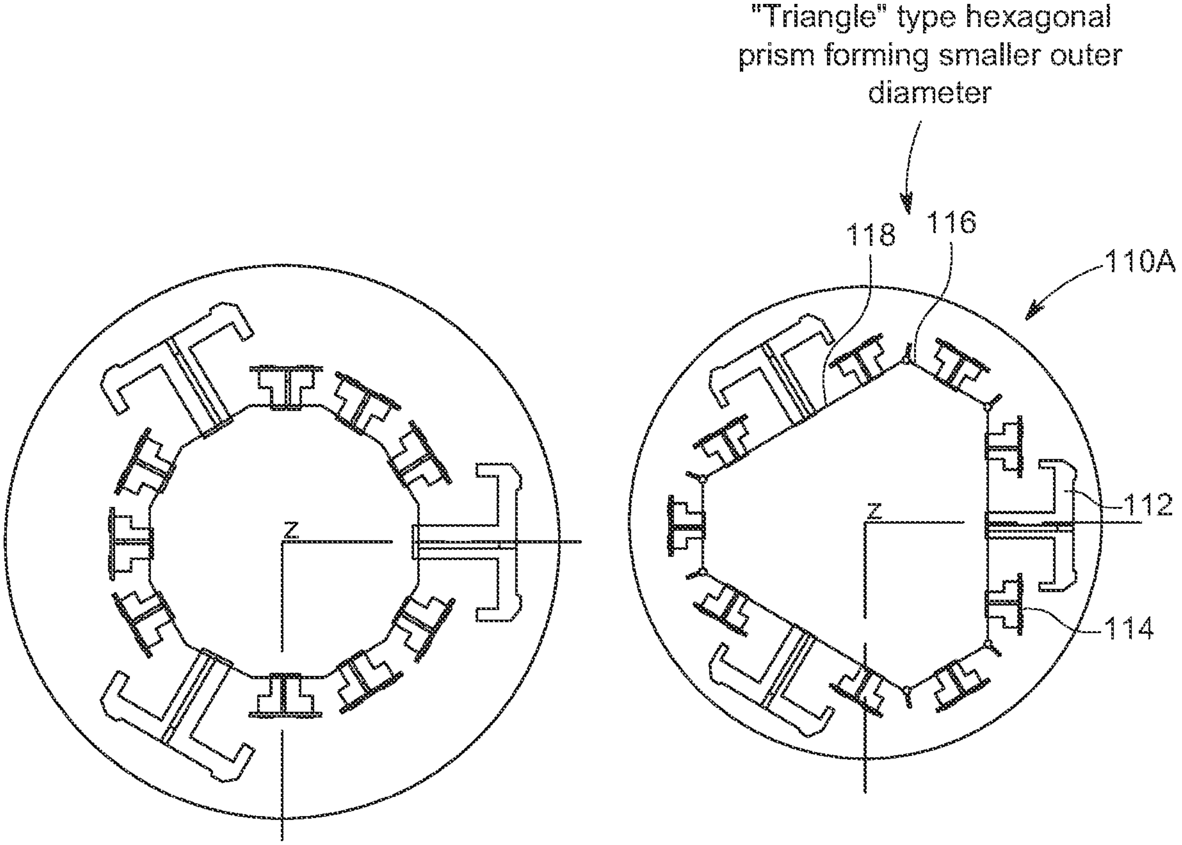
FIG. 8D shows a comparison top view of the antenna of FIG. 1 (left) vs the antenna of FIG. 8A (right)

In another embodiment as shown in FIGS. 8A and 8B an antenna 100 is shown with an upper section 102 having high band elements 104 (BAND-3) and very high band elements 106 (BAND-4) on reflectors 108 and 109 respectively. A bottom portion 110 of antenna 100 includes two separate sections 110*a* (top) and 110*b* (bottom) both including interspersed mid band elements 112 (BAND-2) and low band elements 114 (BAND-1). Upper section 102 with high band elements 104 and very high band elements 106, as in the embodiment shown in FIGS. 5A and 5B, has six high band panels 108 for high band elements 104 (BAND-3) and six interspersed very high band panels 109 for very high band elements 106 (BAND-4).

As shown in FIG. 8 the arrangement of panels 108 and 109 of upper section 102 have a substantially hexagonal structure but the width of panels 108 being greater than the widths of panels 109 giving it an irregular "triangle" type hexagonal structure.

As illustrated in FIG. 8B, top 110*a* and bottom 110*b* halves of lower section 110 uses a similar but larger irregular "triangle" type hexagonal structure in the form of a six-sided prism to host three BAND-2 arrays of elements 112 and one BAND-1 array 122 of elements 114 each of which are on their respective reflector plates 116 (BAND-2) and 118 (BAND-1). This "triangle" type hexagonal geometry of top and bottom halves 110*a* and 110*b*, matching the same geometry of upper section 102 results in a minimal effect on each other. This structure shown in FIG. 8C may optionally used a BAND1 dipole element 114 with a low profile with a width of 164 mm and height of 80 mm as opposed to 150 mm width and 94 mm in height (14 mm shorter) allowing all these elements 114 to be available in an outer radome diameter of 419 mm.

Compared to a regular twelve-sided polygon, modified triangular shape six sided prism as shown in FIGS. 8A and 8B, owing particularly to the shape and differing widths of reflector panels 108, 109, 116 and 118, has the advantage optimizing the use of the available space inside a cylindrical radome cover for the antenna elements. As can be seen from FIG. 8D when the semi triangular prism is used (as opposed to equal twelve-sided polygon), the reflector widths can be quite bigger both for BAND1 and BAND2 which improves co-polar and x-polar isolation and pattern performance and the overall diameter of the antenna can be reduced.

In one optional embodiment two top and bottom plates 150 and 152 for top section 20 sub array in FIGS. 5A and 5B and top section 102 of FIGS. 8A and 8B both have diameters that are roughly equal or equal to the dimeters of the lower half of the antennas respectively. These top and bottom plates 150 and 152 covers the elements of BAND-3 and BAND-4 and have equal shapes and dimensions which preferably have the same shape and size as the lower band sub arrays 12 (FIGS. 5A and 5B) or 110 (FIGS. 8A and 8B) underneath. These plates 150 and 152 are optimized to have maximum isolation between top and bottom sub arrays without disturbing the pattern of bottom array (for example between top array 102 and upper bottom array 110A in FIGS. 8A and 8B). Therefore, the maximum radius of these plates is limited to the radius of the lower band structure. The current is still induced in the internal surface of these wave guiding plates 150 and 152 which in turn reradiates, however this is a re-radiation considered in the design stage rather than the unpredictable and variable re-radiation from the bottom array 110*a* elements (e.g. 112, 114, 116 and 118) which happens in the absence of waveguiding plates, particularly bottom plate 152. For example, the bottom array is typically unpredictable and even when their effect is considered and compensated during the design stage, in real world implementation by changing location of boards and cables inside the bottom part, the effect will become different. However, two metal plates 150 and 152 are simple structures and their effect can be considered in the design and optimize its distance so that its re-radiation does not cause extra sidelobe. This effect stays the same in real world implementations, as these solid plate structures and locations are completely fixed.

The dimensions of metal plates 150 and 152 are optimized based on array performance in all bands. For example, as seen in FIG. 8, where lower array shape 110A is not circular bottom plate 152 of section 102 is likewise not circular, having the same irregular triangular shape. This avoids the effect of these plates on return loss and cross polar isolation of bottom array 110.

These plates 150 and 152 can isolate the two higher bands BAND-3 and BAND-4 from the rest of the antenna (i.e. BAND-2 as in FIGS. 5A and 5B or BAND-1 and BAND-2 as in FIGS. 8A and 8B), and act as a symmetrical wave-guiding structure which guides the wave in required direction, also having a minimum effect on beam peak and reduces the upper SLL. These plates 150 and 152 make the performance of BAND-3 and BAND-4 independent of the rest of array and by optimizing the distance of BAND-3 and BAND-4 elements. This BAND-3 and BAND-4 "block" (upper portion 20 or 102) can be used as a building block in many antennas due to its independency of rest of the array.

In one exemplary feature of this option, the diameter and outside circumference shape of both plates 150 and 152 are the same in order not to affect elevation pattern or tilt. Again, this can be compared to FIG. 4 (prior art) vs. FIG. 7 (present arrangement of FIGS. 5A and 5B) in order to observe the effectiveness of this approach in improving the pattern sidelobe, shape and directivity.

Figure 9:
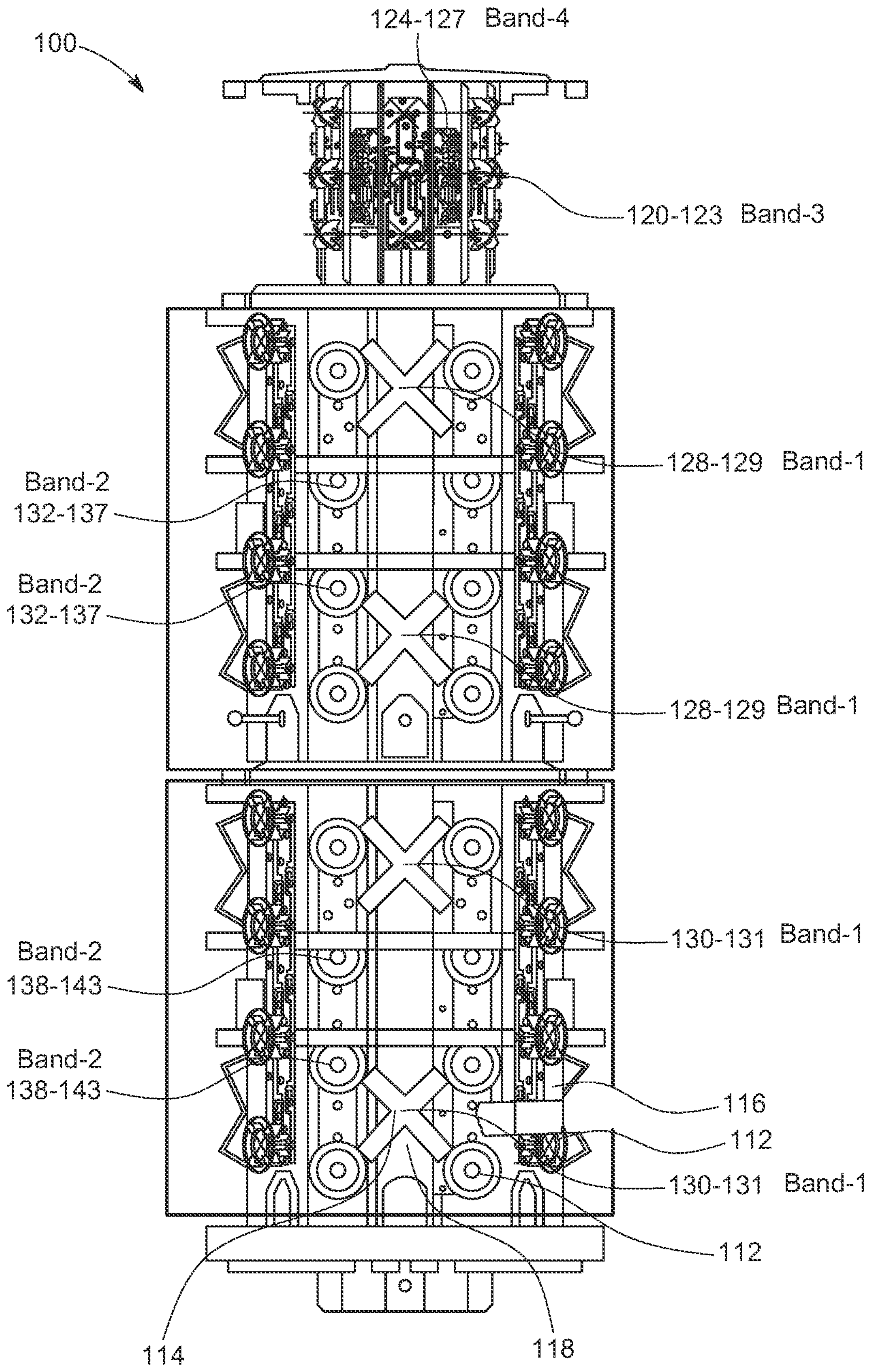
FIG. 9 is a 24 ports implementation of FIG. 8 structure including 4*4 MIMO for BAND-3 and BAND-4, 4*4 MIMO for BAND-1, and 3*(4*4MIMO) for BAND-2, in accordance with one embodiment.

Regarding the feed structures for the embodiment shown in FIGS. 8A and 8B, in one embodiment shown in FIG. 9, the structure shown in FIG. 8A may be used in with twenty-four ports, eight ports 120-127 feeding BAND-3 and BAND-4 elements 104, 106 with four ports 128-131 feeding BAND1 elements 114 and the remaining twelve ports 132-143 feeding BAND-2 elements 112. It is noted that feeding "ports" identified here are technically all found at the bottom of antenna 100, but for the purposes of clarity they are shown on FIG. 9 indicating the columns of elements the ports are in fact assigned to.

Figure 10:
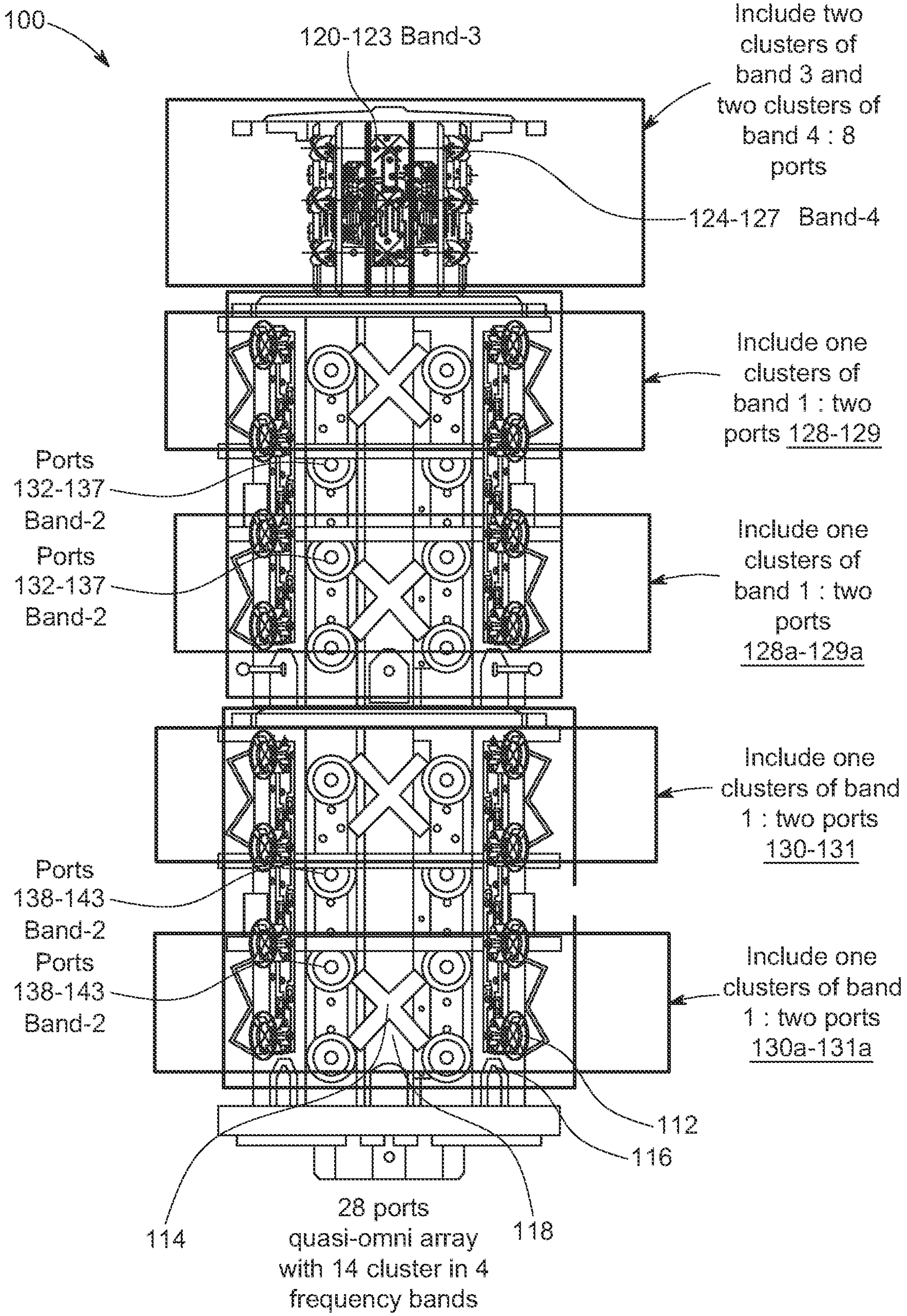
FIG. 10 is a 28 ports implementation of FIG. 8 structure including 4*4 MIMO for BAND-3 and BAND-4, 2*(4*4 MIMO) for BAND-1 and 3*(4*4MIMO) for BAND-2, in accordance with one embodiment.

In another embodiment shown in FIG. 10, the structure shown in FIG. 8A may be used in with twenty-eight ports, eight ports 120-127 feeding BAND-3 and BAND-4 elements 104, 106 with eight ports 128-131 and 128*a*-131*a* feeding BAND1 elements 114 and the remaining twelve ports 132-143 feeding BAND-2 elements 112. The same port labeling arrangement from FIG. 9 applies equally herein FIG. 10.

Figure 11:
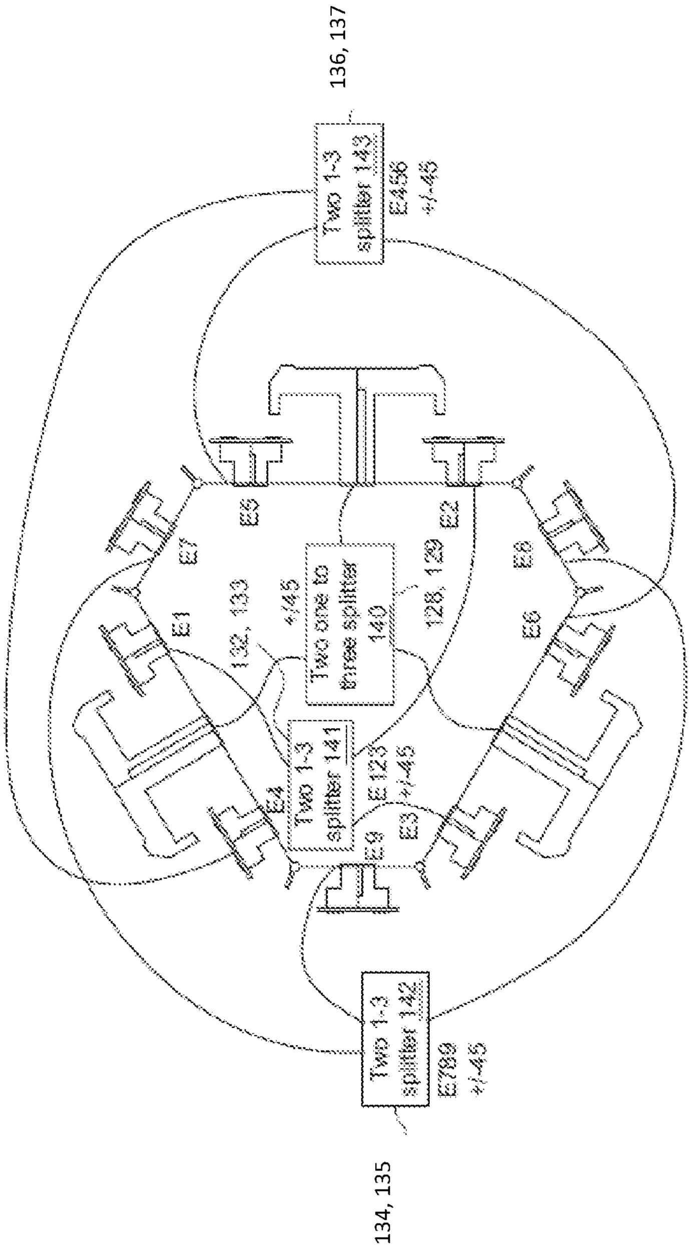
FIG. 11 shows an azimuth feeding network for the quasi omni antenna of FIG. 8 for BAND-1 and BAND-2, in accordance with one embodiment.

In FIG. 11 an exemplary feeding structure for BAND-2 and BAND-1 is shown for one segment of the arrangement of FIG. 9, (e.g. for ports 128-129 (BAND-1) and ports 132-137 (BAND-2)) feeding through four one-three splitters 140, 141, 142, and 143. Such an arrangement could be reproduced for other segments of element on antenna 100.

Figure 12:
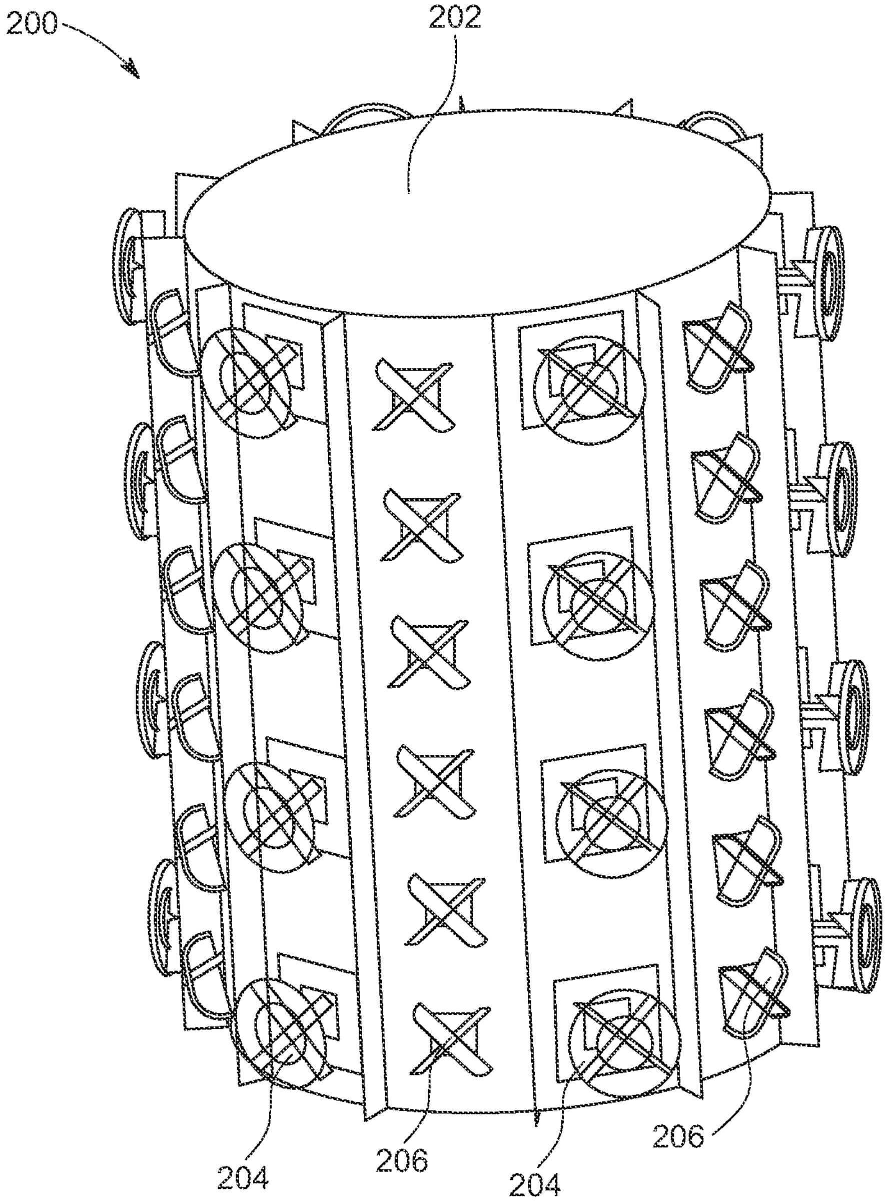
FIG. 12 shows an implementation of a cylindrical array for BAND-2 and BAND-3, in accordance with one embodiment.

In another embodiment of the present invention shown in FIG. 12, an antenna arrangement 200 is shown for BAND-3 and BAND-4 using a cylindrical reflector 202 instead of polygon as shown in the other embodiments in FIGS. 5A and 5B or FIGS. 8A and 8B. Such a cylindrical reflector 202 reduces the number of refracting edges and provides a more stable mechanical design with less metal-to-metal contact.

As with the other embodiments antenna 200 has a plurality of BAND-3 elements 204 and a plurality of BAND-4 elements 206, interspersed around the circumference giving rise to the same positive effects recited above. BAND-3 and BAND-4 elements 204 and 206 may optionally be separated by fencing 208 as shown in FIG. 12. It is understood that such an arrangement with cylindrical reflector 202 could be used in full antenna arrangements with lowed BAND-2 and/or BAND-1 lower portions. Likewise, the arrangement of FIG. 12 may implement the cap plates 150 and 152 similar to the above implementations.

Figure 13:
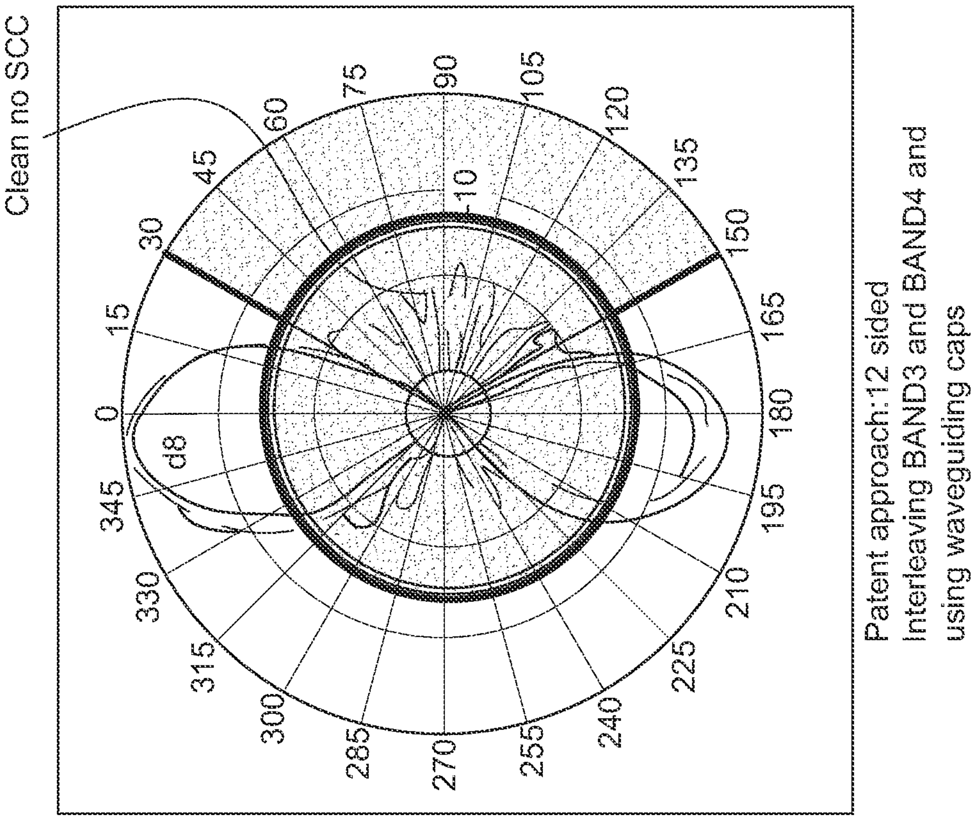
FIG. 13 compares the pattern of a BAND-4 array from FIG. 1 and FIG. 5, in accordance with one embodiment.
Figure 13:
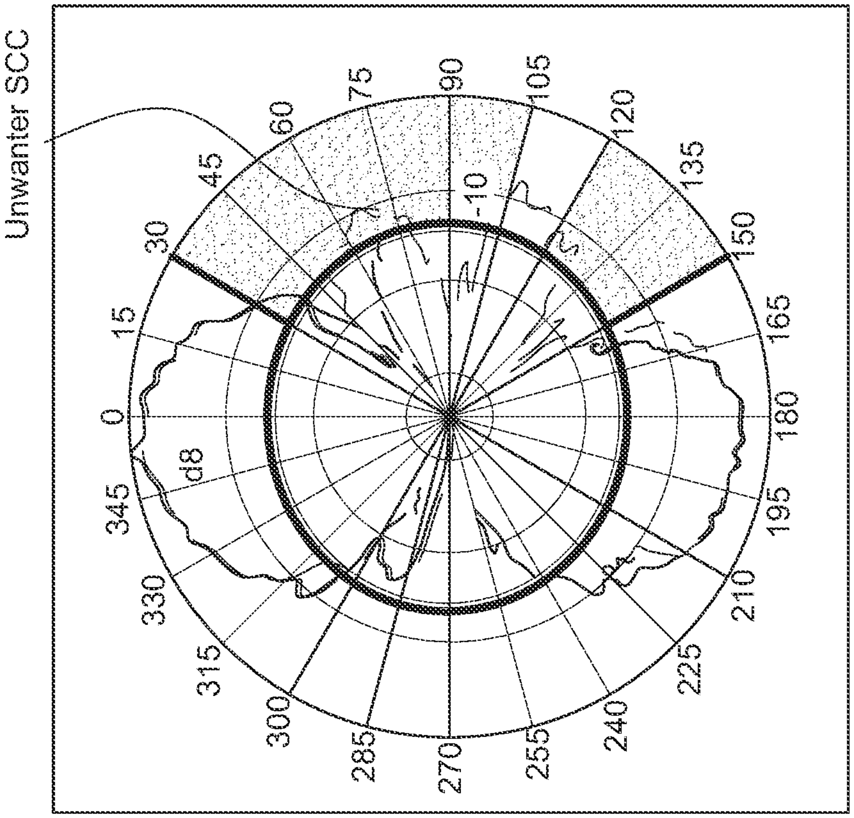

Turning now to elevation patterns showing the effectiveness of the present designs, FIG. 13 compares the pattern of BAND-4 subarray 32 from FIGS. 5A and 5B (left), versus a pattern from BAND-4 in prior art FIG. 1 (right). As can be seen Antenna in FIG. 1 has unwanted sidelobe in FCC region, while the BAND-4 array 32 pattern of FIG. 5 easily achieves FCC criteria.

Figure 14A:
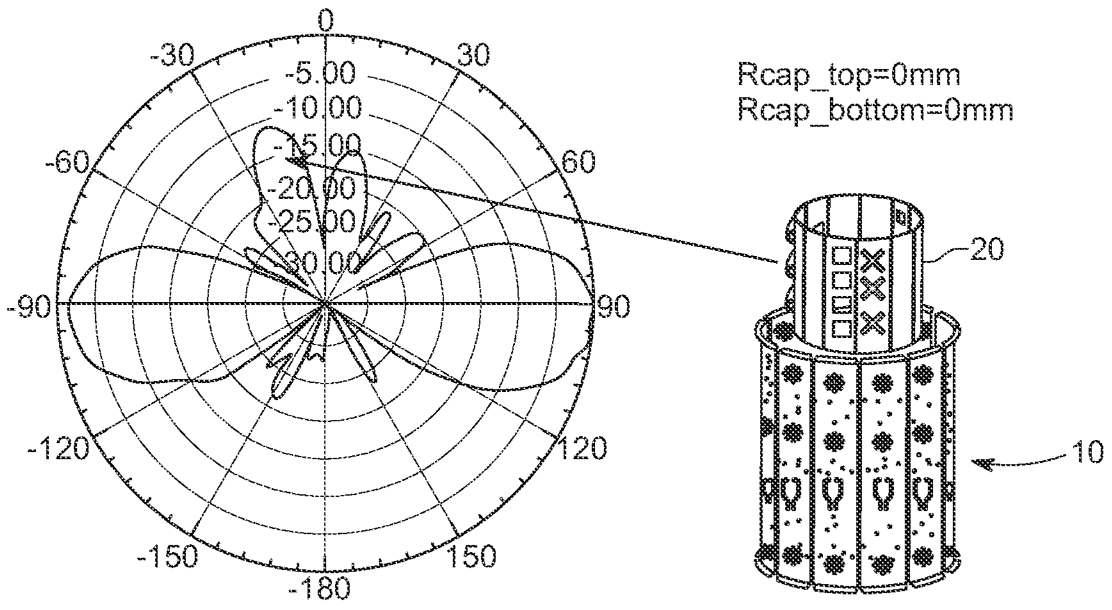
FIGS. 14A-D shows the elevation pattern of BAND-3 in the presence of an exemplary large low-band reflector with different diameter values for the low band wave guiding plates, in accordance with one embodiment.
Figure 14B:
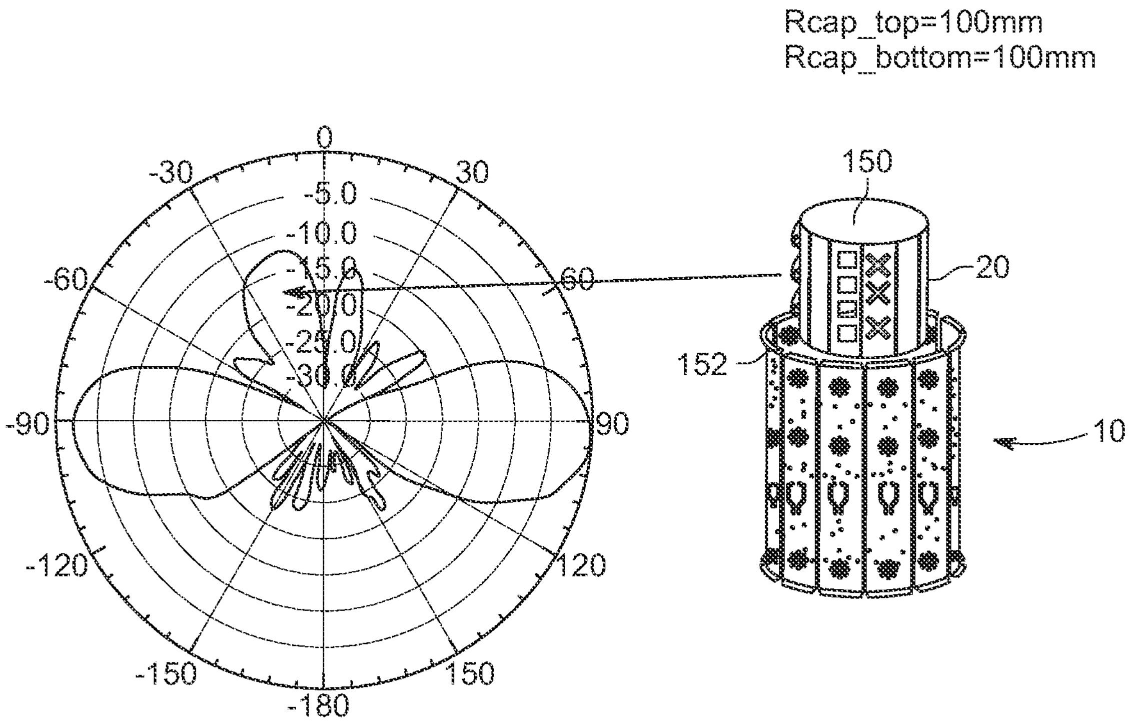
Figure 14C:
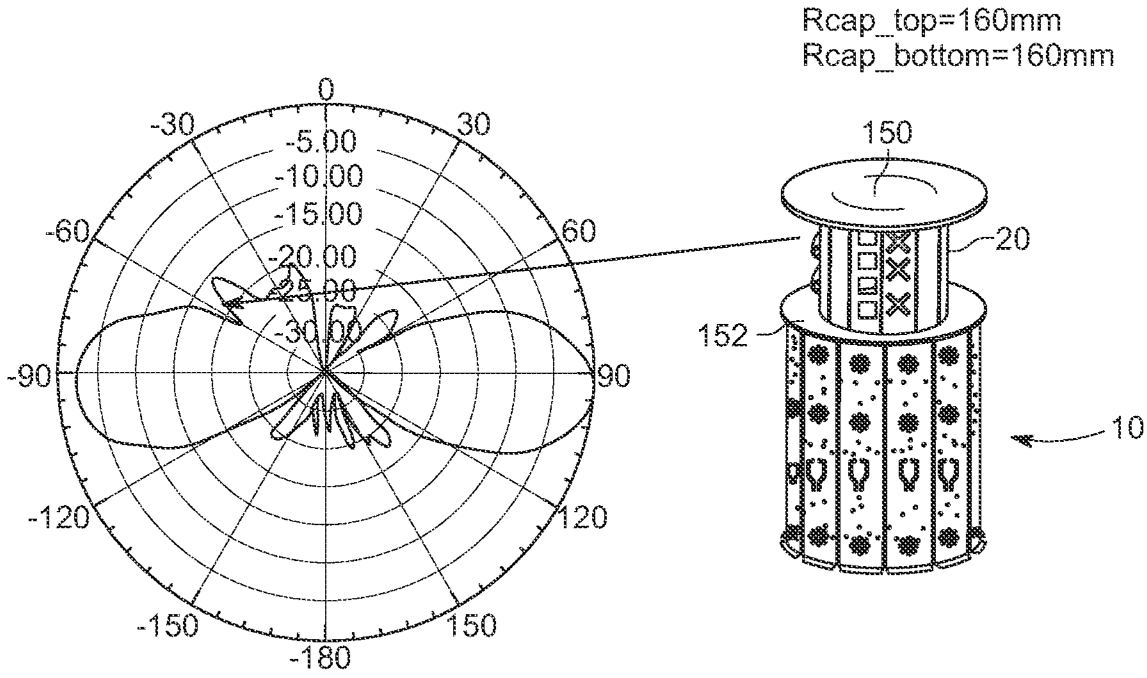
Figure 14D:
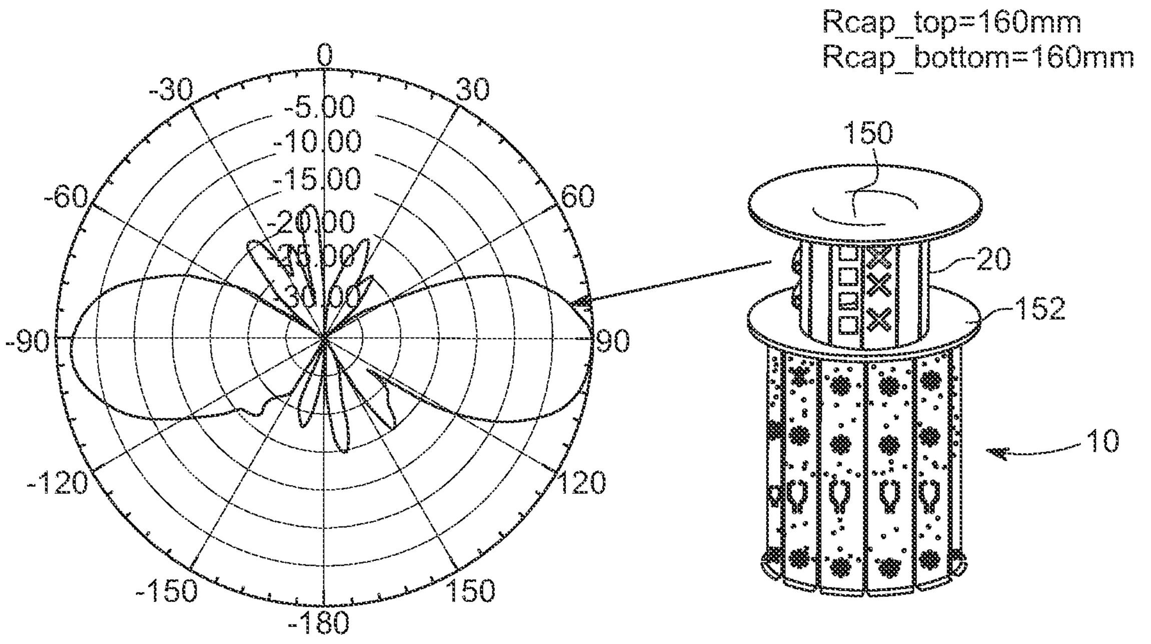

In another FIGS. 14A-14D, to show the further effectiveness of caps 150 and 152, a single plot is shown the elevation pattern of BAND-3 subarray 30 from FIGS. 5A and 5B with various diameter reflectors/waveguide plates 150 (top) and 152 (bottom). FIG. 14A relates to BAND-3 subarray 30 with no caps 150 and 152. FIG. 14B relates to BAND-3 subarray 30 with undersized caps 150 and 152 (100 mm). FIG. 14C relates to BAND-3 subarray 30 with medium sized caps 150 and 152 (160 mm). FIG. 14D relates to BAND-3 subarray 30 with oversized caps 150 and 152 (200 mm).

FIG. 14A demonstrates that if there are no caps SLL is unacceptable with values about 10 dB FIG. 14B demonstrates with 100 mm plate SLL has improved to 12 dB but still not acceptable. FIG. 14C demonstrates that by using 160 mm radius which is the radius of lower array, the SLL is in acceptable range <15 dB. FIG. 14D demonstrates that by going further to 200 mm radius, SLL stays almost the same, but obviously this will require a larger radome. Overall, this shows that the size of the reflector plates 150 and 152 is optimum when it is equal to radius of bottom array. Going more than that radius will have destructive effect on bottom lower band array.

Figure 15A:
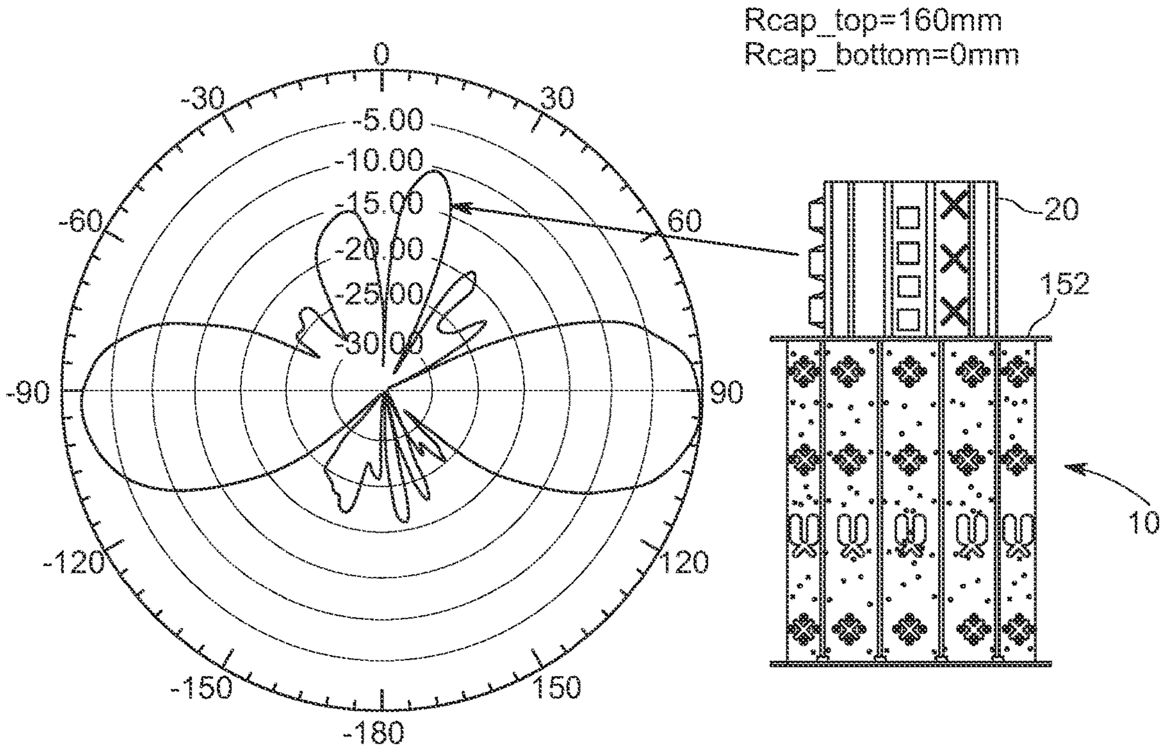
FIGS. 15-A and B compare the pattern of a top only waveguiding plate present, a bottom only waveguiding plate present, and with both plates present, in accordance with one embodiment.
Figure 15B:
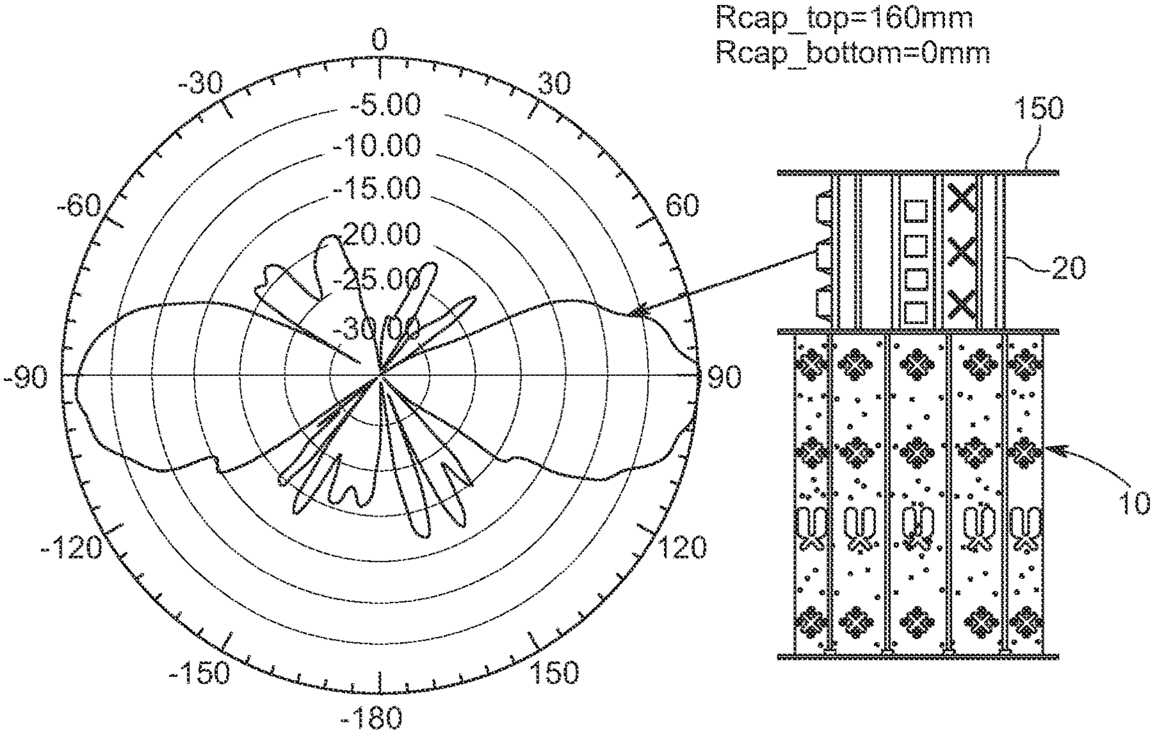

FIGS. 15A AND 15B show the radiation patterns, one having only the top reflector 150, and one for an antenna with only the bottom reflector 152. As can be seen the option with symmetrically sized plates 150 and 152 (FIG. 14C) provides the optimum pattern as described before. When top cap 150 is not present SLL is high and not acceptable and when bottom plate 152 is not present the overlayed pattern for that antenna shows re-radiation from lower structure introducing ripples in the beam shape as shown by the related arrow.

FIGS. 14A-14D and FIG. 15 combine to show the effect of presence and size of the top and bottom isolating reflectors 150 and 152. They show that the optimum dimension for improving SLL of BAND3 array and not affecting BAND2 pattern is to have the diameter same as the diameter of lower array. As can be seen for 0,100 mm, the SLL is high and for 200 mm the big reflector can affect the BAND2 elevation pattern. Also, the last two figures show that the optimum case is to have both top and bottom plate present with equal diameter. This symmetrical structure minimizes the effect of outside environment on the SLL and beam peak performance of BAND3 array.

Figure 16:
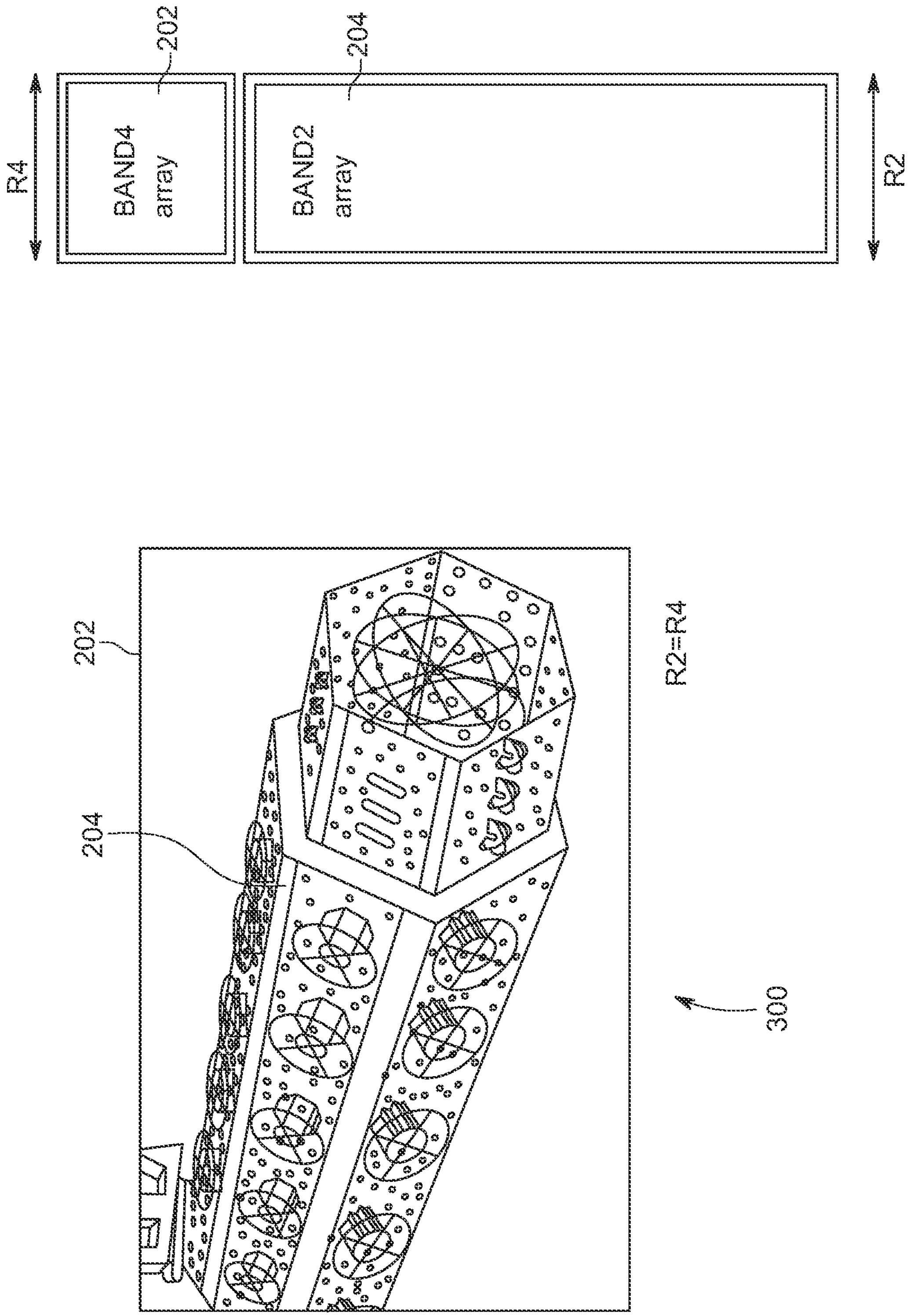
FIG. 16 illustrates a dual band antenna, using the same overall diameter for higher band array (BAND-4) as lower band array (BAND-2); in accordance with one embodiment.
Figure 17:
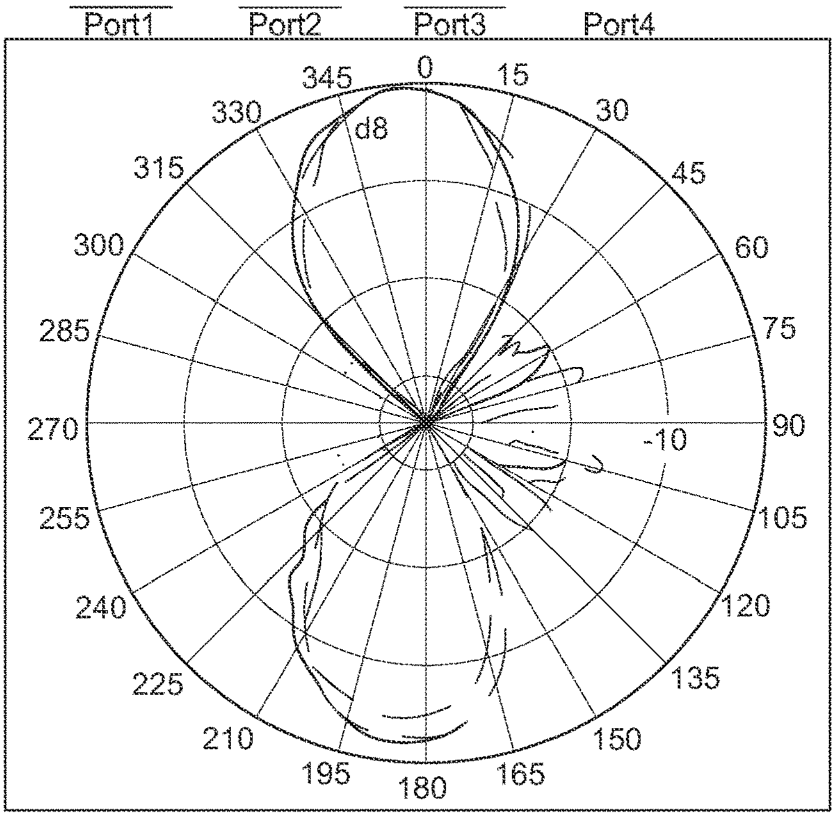
FIG. 17 compares pattern for FIG. 16 where radius of BAND 4 is the same as BAND-2 versus another antenna with the radius of BAND-4 being ½ the radius of BAND-2, in accordance with one embodiment.
Figure 17:
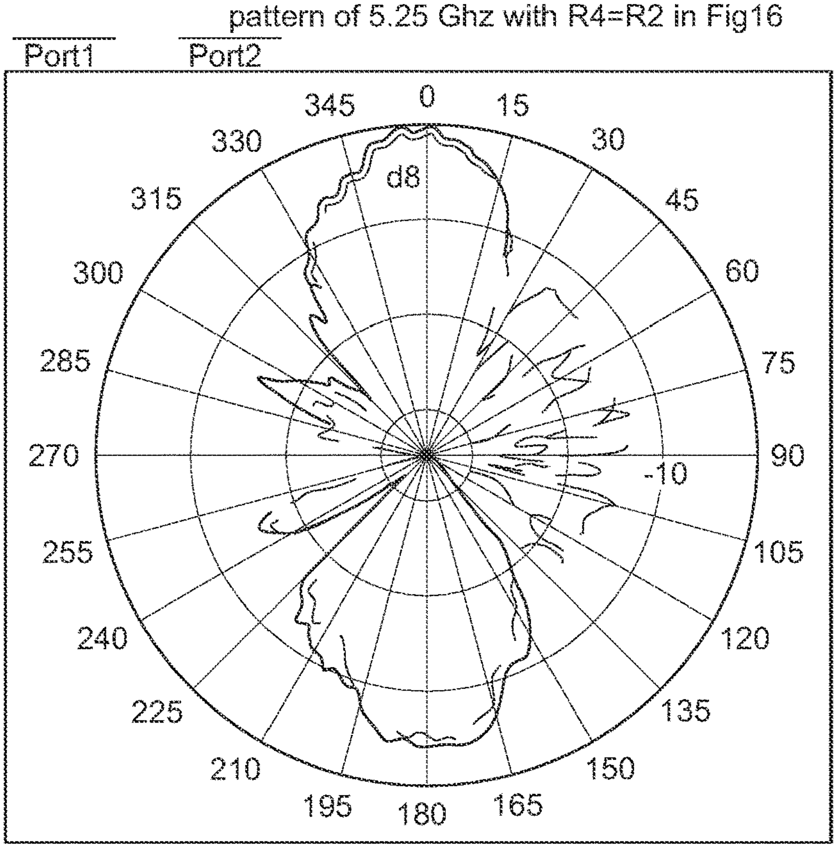

In another embodiment an antenna 200 is provided where stacking of two sub arrays, e.g. subarray for BAND-4 202 and BAND-2 204. This embodiment applies when size and space requirements dictate that differential sizing is not possible. For such cases in order to minimize the effect of lower sub array 204 on upper subarray 202, the radius of higher frequency subarray cylinder 202 is chosen exactly equal to lower frequency subarrays 204. This considerably reduces the interaction of arrays on each other, particularly the effect of lower subarray 204 on the elevation sidelobe of upper array 202, compared to the case where upper subarray has a smaller radius than lower subarray as shown in prior art FIG. 1. FIG. 17 compares the pattern for two different cases of radius where the top pattern is BAND-4 202 sub-array from FIG. 16 (equal radius) and the bottom pattern shows BAND-4 sub-array when its radius is 0.5 times the radius of BAND-2 sub-array (e.g. as in FIG. 1).

While only certain features of the invention have been illustrated and described herein, many modifications, substitutions, changes or equivalents will now occur to those skilled in the art. It is therefore, to be understood that this application is intended to cover all such modifications and changes that fall within the true spirit of the invention.

What is claimed is:

1. An omni-directional small cell base station antenna comprising:

at least one array of a first frequency on a lower portion of said antenna;

at least one second array of a second frequency on an upper portion of said antenna;

at least one third array of a third frequency on said upper portion of said antenna, wherein said second frequency is higher than said first frequency, and wherein said third frequency is higher than said second frequency;

wherein said at least one second array at a second frequency includes a plurality of reflector plates with antenna elements of said second frequency thereon, and wherein said at least one third array at a third frequency includes a plurality of reflector plates with antenna elements of said third frequency thereon, wherein said reflector plates of said at least one second array are interspersed between said reflector plates of said at least one third array such that said reflector plates of said second and third arrays alternate around the circumference of said upper portion of said antenna; and wherein said omni-directional small cell base station antenna further having at least a first upper wave guide plate above said upper portion of said antenna, and at least a second lower wave guide plate below said upper portion of said antenna, said second lower wave guide plate dividing said upper and lower portions of said antenna.

2. The omni-directional small cell base station antenna, as claimed in claim 1, wherein said first frequency is a mid band range at 1.69-2.69 GHz, wherein said second frequency is a high band range at 3.3-3.8 GHz, and wherein said third frequency is a very high band range at 5.15-5.92 GHz.

3. The omni-directional small cell base station antenna, as claimed in claim 1, wherein said upper wave guide plate and lower wave guide plate are the same diameter, and both are substantially the same size as the diameter of said lower portion.

4. The omni-directional small cell base station antenna, as claimed in claim 1, wherein said plurality of reflector plates of said second array with antenna elements of said second frequency thereon, are wider than said plurality of reflector plates of said third array with antenna elements of said third frequency thereon so as to reduce the effect of an induction current from said second array on said third array.

5. An omni-directional small cell base station antenna comprising:

at least one array of a first frequency on a lower portion of said antenna;

at least one second array of a second frequency on an upper portion of said antenna;

at least one third array of a third frequency on said upper portion of said antenna, wherein said second frequency is higher than said first frequency, and wherein said third frequency is higher than said second frequency;

wherein said at least one second array at a second frequency includes a plurality of reflector plates with antenna elements of said second frequency thereon, and wherein said at least one third array at a third frequency includes a plurality of reflector plates with antenna elements of said third frequency thereon, wherein said plurality of reflector plates of said second array with antenna elements of said second frequency thereon, are wider than said plurality of reflector plates of said third array with antenna elements of said third frequency thereon, and wherein said upper portion of said antenna has a substantially triangular structure composed of six sides, owing to the different widths of said reflector plates of said second and third arrays.

6. The omni-directional small cell base station antenna, as claimed in claim 5, wherein said lower portion has reflector plates for said first array of differing widths so that it has a substantially triangular structure composed of six sides matching shape to said upper portion of said antenna.

7. The omni-directional small cell base station antenna, as claimed in claim 5, wherein said reflector plates of said at least one second array are interspersed between said reflector plates of said at least one third array such that said reflector plates of said second and third arrays alternate around the circumference of said upper portion of said antenna.

8. The omni-directional small cell base station antenna, as claimed in claim 5, wherein said first frequency is a mid band range at 1.69-2.69 GHz, wherein said second frequency is a high band range at 3.3-3.8 GHz, and wherein said third frequency is a very high band range at 5.15-5.92 GHz.

9. The omni-directional small cell base station antenna, as claimed in claim 5, further having at least a first upper wave guide plate above said upper portion of said antenna, and at least a second lower wave guide plate below said upper portion of said antenna, said second lower wave guide plate dividing said upper and lower portions of said antenna.

10. The omni-directional small cell base station antenna, as claimed in claim 9, wherein said upper wave guide plate and lower wave guide plate are the same diameter, and both are substantially the same size as the diameter of said lower portion.

11. An omni-directional small cell base station antenna comprising:

at least one array of a first frequency on a lower portion of said antenna;

at least one second array of a second frequency on an upper portion of said antenna;

at least one third array of a third frequency on said upper portion of said antenna, wherein said second frequency is higher than said first frequency, and wherein said third frequency is higher than said second frequency;

wherein said at least one second array at a second frequency includes a plurality of reflector plates with antenna elements of said second frequency thereon, and wherein said at least one third array at a third frequency includes a plurality of reflector plates with antenna elements of said third frequency thereon, and wherein said antenna further has at least a first upper wave guide plate above said upper portion of said antenna, and at least a second lower wave guide plate below said upper portion of said antenna, said second lower wave guide plate dividing said upper and lower portions of said antenna.

12. The omni-directional small cell base station antenna, as claimed in claim 11, wherein said upper wave guide plate and lower wave guide plate are the same diameter, and both are substantially the same size as the diameter of said lower portion.

13. The omni-directional small cell base station antenna, as claimed in claim 11, wherein said first frequency is a mid band range at 1.69-2.69 GHz, wherein said second frequency is a high band range at 3.3-3.8 GHz, and wherein said third frequency is a very high band range at 5.15-5.92 GHz.

14. The omni-directional small cell base station antenna, as claimed in claim 11, wherein said reflector plates of said at least one second array are interspersed between said reflector plates of said at least one third array such that said reflector plates of said second and third arrays alternate around the circumference of said upper portion of said antenna.

15. The omni-directional small cell base station antenna, as claimed in claim 14, wherein said plurality of reflector plates of said second array with antenna elements of said second frequency thereon, are wider than said plurality of reflector plates of said third array with antenna elements of said third frequency thereon so as to reduce the effect of an induction current from said second array on said third array.

16. The omni-directional small cell base station antenna, as claimed in claim 15, wherein said upper portion of said antenna has a substantially triangular structure composed of six sides, owing to the different widths of said reflector plates of said second and third arrays.

17. The omni-directional small cell base station antenna, as claimed in claim 16, wherein said lower portion has reflector plates for said first array of differing widths so that it has a substantially triangular structure composed of six sides matching shape to said upper portion of said antenna.

* * * * *